(12) United States Patent
Hirano et al.

(10) Patent No.: US 9,822,970 B2
(45) Date of Patent: Nov. 21, 2017

(54) COMBUSTION DEVICE FOR MELTING FURNACE, AND MELTING FURNACE

(75) Inventors: Makoto Hirano, Osaka (JP); Hitoshi Inoue, Hannan (JP)

(73) Assignee: Osaka Gas Co., Ltd., Osaka (JP)

( * ) Notice: Subject to any disclaimer, the term of this patent is extended or adjusted under 35 U.S.C. 154(b) by 713 days.

(21) Appl. No.: 13/823,577

(22) PCT Filed: Feb. 15, 2011

(86) PCT No.: PCT/JP2011/053149
§ 371 (c)(1),
(2), (4) Date: May 1, 2013

(87) PCT Pub. No.: WO2012/035793
PCT Pub. Date: Mar. 22, 2012

(65) Prior Publication Data
US 2013/0236846 A1 Sep. 12, 2013

(30) Foreign Application Priority Data

Sep. 14, 2010 (JP) .................. 2010-206133

(51) Int. Cl.
*F23D 14/22* (2006.01)
*F27B 3/00* (2006.01)
(Continued)

(52) U.S. Cl.
CPC .............. *F23D 14/22* (2013.01); *C03B 5/235* (2013.01); *F23D 14/20* (2013.01); *F23D 14/48* (2013.01); *F23D 14/58* (2013.01); *F23D 91/02* (2015.07); *F27B 3/002* (2013.01); *F27B 3/007* (2013.01); *F27B 3/02* (2013.01); *F27B 3/205* (2013.01); *F27D 99/0033* (2013.01); *F27D 2099/004* (2013.01)

(58) Field of Classification Search
USPC .................. 432/196, 179–181; 431/174–180
See application file for complete search history.

(56) References Cited

U.S. PATENT DOCUMENTS 2,310,704 A * 2/1943 Mulholland ............ C03B 5/235
239/423
5,395,416 A * 3/1995 Pieper .................... F27B 3/205
431/167
(Continued)

FOREIGN PATENT DOCUMENTS

CN 1046146 A 10/1990
CN 1961181 A 5/2007
(Continued)

*Primary Examiner* — Nathaniel Herzfeld
(74) *Attorney, Agent, or Firm* — The Webb Law Firm

(57) ABSTRACT

An object of the present invention is to provide a combustion device which does not cause an increase in the amount of generated NOx or a degradation in efficiency due to a lower flame luminance, even when the combustion space is limited in the lengthwise direction of the flame. A fuel ejector is configured so as to be provided with at least a first fuel ejector and a second fuel ejector lined up in a specific direction as viewed in the lengthwise direction of fuel ejection, and is configured so that a first ejection stream ejected from the first fuel ejector and the second fuel ejector collide on the downstream side of ejection.

11 Claims, 16 Drawing Sheets

(51) Int. Cl.
   *F27B 3/02*      (2006.01)
   *F27B 3/20*      (2006.01)
   *F27D 99/00*     (2010.01)
   *F23D 14/20*     (2006.01)
   *F23D 14/48*     (2006.01)
   *F23D 14/58*     (2006.01)
   *C03B 5/235*     (2006.01)
   *F23D 99/00*     (2010.01)

(56) References Cited

U.S. PATENT DOCUMENTS

| | | | | |
|---|---|---|---|---|
| 5,569,312 | A * | 10/1996 | Quirk | B01D 53/56 110/210 |
| 6,102,691 | A * | 8/2000 | Mitani | F23C 3/002 431/11 |
| 6,926,516 | B1 * | 8/2005 | Sudo | F23D 14/22 239/433 |
| 8,875,544 | B2 * | 11/2014 | Charbonneau | F23D 14/64 431/284 |
| 2006/0057517 | A1 * | 3/2006 | Joshi | C03B 5/235 431/12 |
| 2007/0037106 | A1 * | 2/2007 | Kobayashi | F23D 14/22 431/8 |
| 2008/0096146 | A1 * | 4/2008 | Li | F23C 6/045 431/9 |
| 2009/0320528 | A1 * | 12/2009 | Skarzenski | B23K 31/02 65/494 |
| 2011/0061642 | A1 * | 3/2011 | Rouchy | C03B 5/235 126/39 E |
| 2012/0151966 | A1 * | 6/2012 | Sakamoto | C03B 3/026 65/66 |
| 2013/0137055 | A1 * | 5/2013 | Hirano | F23C 5/28 432/196 |

FOREIGN PATENT DOCUMENTS

| | | | |
|---|---|---|---|
| CN | 101568651 | A | 10/2009 |
| JP | 1182929 | A | 3/1999 |
| JP | 2002286225 | A * | 10/2002 |
| JP | 2003269703 | A | 9/2003 |
| JP | 2003269709 | A | 9/2003 |
| JP | 2004294042 | A | 10/2004 |
| JP | 2004317116 | A | 11/2004 |
| JP | 2006275395 | A | 10/2006 |
| JP | 200771530 | A | 3/2007 |
| JP | 200793089 | A | 4/2007 |
| JP | 2007139380 | A | 6/2007 |
| JP | 2009243853 | A | 10/2009 |
| TW | 365374 | | 6/1987 |
| WO | 2005095854 | A1 | 10/2005 |
| WO | 2008076901 | A1 | 6/2008 |

* cited by examiner

| NOZZLE TYPE | NOZZLE SHAPE | FLAME SHAPE | |
|---|---|---|---|
| | | AS VIEWED FROM ABOVE | AS VIEWED FROM THE SIDE |
| ROUND-HOLE NOZZLE | | | |
| OVAL-HOLE NOZZLE | | | |
| FLAT-FLAME NOZZLE | | | |
| IMPINGING JET NOZZLE | | | |

COMBUSTION DEVICE FOR MELTING FURNACE, AND MELTING FURNACE

TECHNICAL FIELD

The present invention relates to a combustion device for a melting furnace and a melting furnace provided with the combustion device for a melting furnace, wherein a fuel ejector for ejecting gas fuel into a combustion space above an area of a melting zone in which an object to be melted is present is provided so as to eject gas fuel from a lateral location of the combustion space, and wherein a combustion air feeder for feeding combustion air obliquely downward to the combustion space is provided in a location above the combustion space.

BACKGROUND ART

This combustion device for a melting furnace is used in melting furnaces for melting glass, metal, or another object to be melted, and cross fired types and end-port types are well known as melting furnaces provided with a combustion device for a melting furnace.

A cross fired furnace has a structure in which a combustion device N for a melting furnace is lined up on a lateral section of a melting zone, along the direction in which an charging port 4i for inputting raw material into the melting zone 2 and an extraction port 4e for extracting a melted object are lined up (see FIG. 2). An end-port melting furnace has the charging port 4i for inputting raw material provided to a lateral location on the upstream side of the melting zone 2, and the extraction port 4e for extracting the melted object provided below the front surface on the downstream side of the melting zone. The combustion device N is provided in the vicinity of the charging port 4i (see FIG. 22).

The present inventors have proposed a configuration for such a combustion device for a melting furnace, comprising a center ejection path for ejecting gas fuel and an annular peripheral ejection path positioned about the periphery thereof, wherein the distal end side of the peripheral ejection path is made to project from the center ejection path and is formed in a tapered shape in which diameter is reduced in progress toward the distal end side, and gas fuel is ejected so as to converge at the distal end side.

Using this configuration makes it possible to form a strong firm flame (a strong, rectilinearly long flame) and to suppress the generation of NOx while dispensing with the need for a dedicated cooling fluid for cooling the fuel ejector (e.g., see Patent Document 1).

PRIOR ART DOCUMENTS

Patent Documents

Patent Document 1: Japanese Patent No. 4046633 (FIGS. 5 and 6)

DISCLOSURE OF THE INVENTION

Problems that the Invention is Intended to Solve

Melting furnaces that adopt such a combustion device are becoming available with a small melting zone.

In the case of this type of small melting zone, the furnace walls positioned on both sides (the two left and right sides in FIG. 23) along the movement direction of the melted object are closer to each other in, e.g., the cross fired furnace shown in FIG. 23. In an end-port melting furnace, the position of a partitioning wall (100 in FIG. 22) facing the furnace wall provided with the combustion air feeder and the fuel ejector is closer to the combustion position on the lower side (right side in FIG. 22) in the movement direction of the melted object.

In such a melting furnace, there is no leeway in the combustion space in the lengthwise direction of the flame (the distance in the stated direction is short in the combustion space), and with, e.g., the conventional combustion device described in Patent Document 1, the gas ejection speed must been increased in order to shorten the flame. In this manner, efficiency is reduced due to a lower flame luminance when the gas ejection speed is increased, and the amount of generated NOx is increased.

In the further case that a cross fired-type alternating combustion furnace structure is used, the flame formed by one of the combustion devices penetrates the other combustion air feed port, as shown in FIG. 23. The heat generated by the flame cannot be sufficiently used for melting the melt object, the ceiling area indicated by X in FIG. 23 is heated, and there is possibility that the furnace will be damaged.

The present invention was contrived in view of the above-described circumstances, it being an object thereof to provide a combustion device which does not cause an increase in the amount of generated NOx or a degradation in efficiency due to a lower flame luminance, even when the combustion space is limited in the lengthwise direction of the flame.

Means for Solving the Problems

The characteristic feature for solving the above-mentioned problems is a combustion device for a melting furnace in which a fuel ejector for ejecting gas fuel into a combustion space above an area of a melting zone in which an object to be melted is present is disposed so as to eject the gas fuel from a lateral location in the combustion space, and in which a combustion air feeder for feeding combustion air obliquely downward to the combustion space is disposed in a location above the fuel ejector, wherein the fuel ejector comprises a first fuel ejector and a second fuel ejector lined up in at least one specific direction, as viewed in the lengthwise direction of fuel ejection; and a first ejection stream ejected from the first fuel ejector and a second ejection stream ejected from the second fuel ejector collide on the downstream side of ejection.

Since this combustion device for a melting furnace is installed in a melting furnace, combustion air is fed obliquely downward from the combustion air feeder to the combustion space, and the gas fuel from the fuel ejector is ejected into the combustion air above an area of a melting zone in which an object to be melted is present, the gas fuel ejected from the fuel ejector mixes with the combustion space in the combustion space and combusts above the melting zone. The fuel ejector comprises a first fuel ejector and a second fuel ejector lined up in at least one specific direction, as viewed in the lengthwise direction of fuel ejection.

The flame formed by this combustion is formed in a state which the first ejection stream ejected from the first fuel ejector and the second ejection stream ejected from the second fuel ejector collide on the downstream side of ejection, and is therefore a flame that widens in the specific direction in a plane that includes the fuel ejectors of the first ejection stream and the second ejection stream and the collision position. In other words, the flame overall is relatively short in the ejection direction and a flame opened (widened) in the specific direction can be readily formed.

The resulting combustion device does not cause an increase in the amount of NOx that is generated or a degradation in efficiency due to a decrease in flame luminance, even when the combustion space is limited in the lengthwise direction of the flame (the distance in the stated direction is short in the combustion space).

According to another aspect of the combustion device for a melting furnace provided with the above-noted characteristic feature, it is preferred that each of the first fuel ejector and the second fuel ejector comprises a single fuel ejection orifice; and the first ejection stream ejected from the first fuel ejection orifice positioned to one side in the specific direction and the second ejection stream ejected from the second fuel ejection orifice positioned to the other side in the specific direction be configured so as to collide on the downstream side of ejection.

Using such a configuration makes it possible to form a flame having a relatively short length and that is sufficiently opened (widened) in the specific direction using the simplest configuration. Therefore, it is possible to sufficiently heat an object to be heated and the ceiling even in the vicinity of the furnace sidewalls.

Also, with this configuration, the spread of the flame in the direction orthogonal to the specific direction, as viewed in the lengthwise direction of fuel ejection, is more readily suppressed to a certain extent.

According to another aspect of the combustion device for a melting furnace provided with the above-noted characteristic feature, it is preferred that a plurality of fuel ejection orifices be lined up in an orthogonal direction orthogonal to the specific direction as viewed in the lengthwise direction of fuel ejection, in each of the first fuel ejector and the second fuel ejector, and in relation to the first fuel ejection orifices positioned on one side and second fuel ejection orifices positioned on the other side thus forming a pair in the specific direction, a first ejection stream ejected from the first fuel ejection orifices and a second ejection stream ejected from the second fuel ejection orifices be configured so as to collide on the downstream side of ejection between the fuel ejection orifices constituting a pair.

Using such a configuration makes it possible to form a flame having a relatively short length and that is sufficiently opened (widened) in the specific direction. Therefore, it is possible to sufficiently heat an object to be heated and the ceiling even in the vicinity of the furnace sidewalls.

Furthermore, with this configuration, the spread of the flame in the direction orthogonal to the specific direction, as viewed in the lengthwise direction of fuel ejection, can be ensured to a certain extent.

In the configuration provided with a plurality of fuel ejection orifices described above, it is preferred that the plurality of first fuel ejection orifices provided to the first fuel ejector and the plurality of second fuel ejection orifices provided to the second fuel ejector be configured to widen in a radial fashion on the downstream side of ejection or to converge inside a predetermined range as viewed in the specific direction.

Using a configuration that widens the flame in a radial fashion allows the widening of the flame to be sufficiently ensured in a direction orthogonal to the specific direction as viewed in the lengthwise direction of fuel ejection.

Using a configuration that converges the flame in a predetermined range allows the widening of the flame to be sufficiently suppressed in a direction orthogonal to the specific direction as viewed in the lengthwise direction of fuel ejection.

In the combustion device for a melting furnace provided with a first fuel ejection orifice and a second ejection orifice constituting a pair in the specific direction, it is preferred that auxiliary ejection orifices be provided in a medial position in the specific direction between the first fuel ejection orifice and the second fuel ejection orifice in relation to the fuel ejection orifices constituting a pair in the specific direction, and in positions on both sides in the orthogonal direction orthogonal to the specific direction as viewed in the lengthwise direction of the fuel ejection in relation to the fuel ejection orifices constituting a pair in the specific direction.

Providing auxiliary ejection orifices to both sides in the orthogonal direction thus allows control from the orthogonal direction of the flame as described above, and the fuel ejectors, fuel ejection orifices, and the like can be cooled and protected by gas ejected from the auxiliary holes.

In the combustion device for a melting furnace described above, it is preferred that the first fuel ejector and the second fuel ejector be provided with fuel ejection orifices; and the amount of gas fuel of a first ejection stream ejected from the first fuel ejection orifices positioned to one side in the specific direction and the amount of gas fuel of a second ejection stream ejected from the second fuel ejection orifices positioned to the other side be configured so as to be capable of being mutually or independently adjusted.

Thus, the amount of gas fuel ejected from the fuel ejection orifices can be adjusted independently or in a mutually related manner between the first fuel ejection orifices and the corresponding second ejection orifices, whereby "the flame length," the extent and direction of widening of the flame in the specific direction," and "the flame luminance" of the flame to be formed can be adjusted.

A combustion device for a melting furnace according to the present invention was described above, and the melting furnace according to the present invention is capable of achieving the object of the present invention by using the configuration described below.

Specifically, in a melting furnace:

a fuel ejector for ejecting gas fuel into a combustion space above an area of a melting zone in which an object to be melted is present is disposed so as to eject gas fuel from a lateral location in the combustion space;

a combustion air feeder for feeding combustion air obliquely downward to the combustion space is disposed in a location above the fuel ejector; and the gas fuel is caused to combust.

The combustion device for a melting furnace described above is provided in a furnace wall, whereby a melting furnace is obtained that does not cause an increase in the amount of NOx that is generated or a degradation in efficiency due to a decrease in flame luminance, even when the combustion space is limited in the lengthwise direction of the flame.

In the melting furnace described above, it is preferred that at least a pair of combustion devices having the fuel ejector and the combustion air feeder for feeding combustion air to gas fuel ejected from the fuel ejector be provided; and in a state where gas fuel is fed from the fuel ejector of the combustion device on a first side and combustion air is fed from a combustion air feeder, the combustion air feeder of the combustion device on a second side serves as an exhaust gas introduction unit for receiving from the combustion space the exhaust gas generated by combustion carried out by the combustion device on the first side, and alternating combustion for repeatedly combusting gas fuel and receiving exhaust gas in alternating fashion be carried out between the combustion devices constituting a pair.

Providing the combustion device according to the present invention to a furnace wall makes it possible to obtain an alternating combustion-type melting furnace that does not cause an increase in the amount of NOx that is generated or a degradation in efficiency due to a decrease in flame luminance, even when the combustion space is limited in the lengthwise direction of the flame in a melting furnace that uses an alternating combustion scheme capable of efficiently and stably heating and melting an object to be melted.

In the melting furnace described above, it is preferred that a pair of the combustion devices be provided on both sides with the movement direction of the object to be melted therebetween; and the combustion air feeder of the combustion device on the second side be opened in a distal end in the axial direction of a flame formed by the combustion of gas fuel ejected from the fuel ejector of the combustion device on the first side.

The flame formed by the combustion device of the present invention is shorter in length and greater in width in the specific direction. As a result, the flame does not enter into the combustion air feeder of the combustion device on the second side, even in an alternating combustion-type melting furnace having a structure in which the combustion air feeder of the combustion device on the second side is opened in the distal end in the axial direction of the flame formed by the combustion of gas fuel ejected from the fuel ejector of the combustion device on the first side.

In the melting furnace described above, it is preferred that, in a furnace wall through-hole in which the fuel ejector is to be provided, the cross-sectional area of a furnace wall through-hole gradually increases in progression from the distal end of the fuel ejector toward the inside end face of the melting furnace; and the position of collision between a first ejection stream ejected from the first fuel ejectors and a second ejection stream ejected from the second fuel ejectors is set further to the inner side of the furnace wall than the inside end face of the melting furnace.

Using such a configuration makes to possible to suppress an increase in the temperature of the fuel ejector and to advantageously protect the nozzles provided in these areas.

BEST MODE FOR CARRYING OUT THE INVENTION

Embodiments

Figure 1:
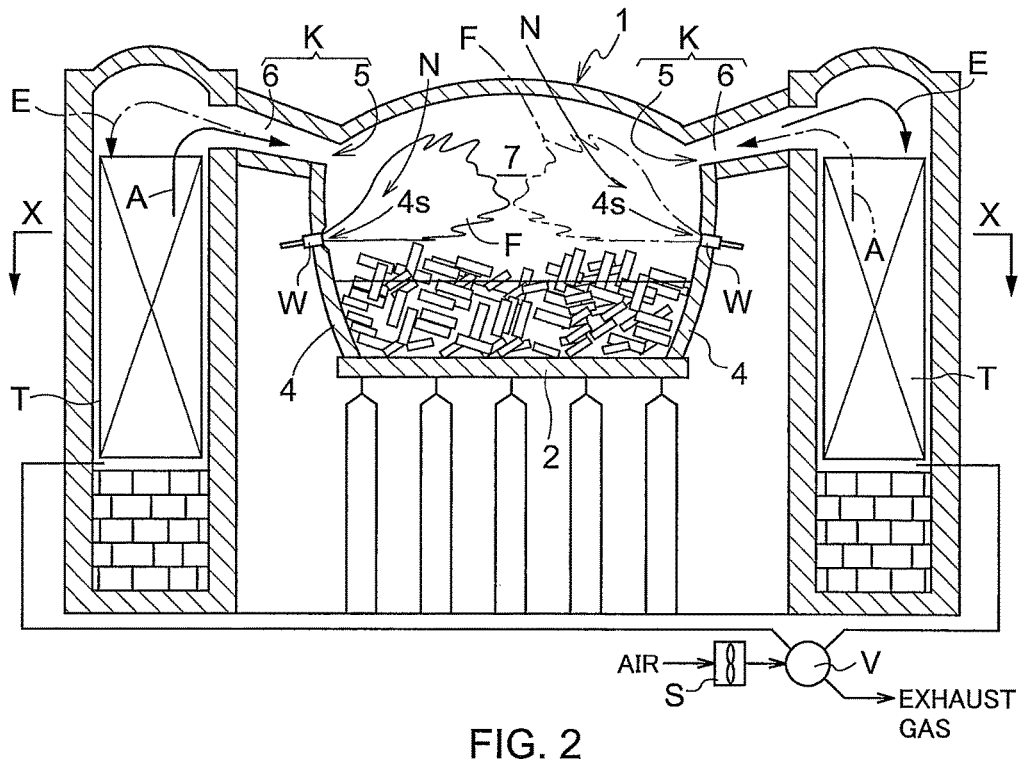
FIG. 1 is a front surface view of a longitudinal section (cross section on the charging port side) of a glass-melting furnace.

Embodiments of the present invention will be described below with reference to the drawings. In the present embodiment, an example will be described in which the lengthwise direction of fuel ejection is the depth direction of the plane of the drawing of FIG. 5 (the crosswise direction in FIG. 1), the specific direction as viewed in the lengthwise direction of fuel ejection is the vertical direction of FIG. 5 (vertical direction in FIG. 1), and the orthogonal direction orthogonal to the specific direction as viewed in the lengthwise direction of fuel ejection is the crosswise direction of FIG. 5 (the depth direction of plane of the drawing in FIG. 1). The phrase "as viewed in the lengthwise direction of fuel ejection" means "as seen in the direction of the overall flow of gas fuel," e.g., a state in which the upstream-side direction viewed from the downstream side of the gas fuel.

Figure 2:
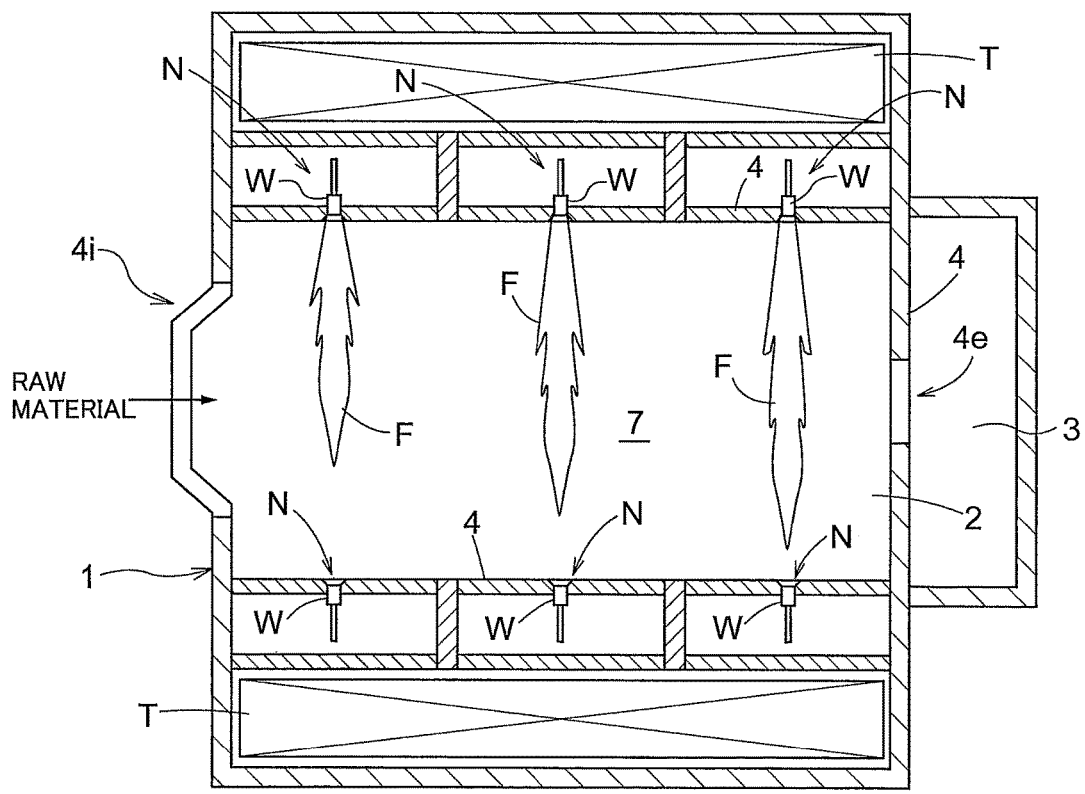
FIG. 2 is a view along the line X-X of FIG. 1.
Figure 3:
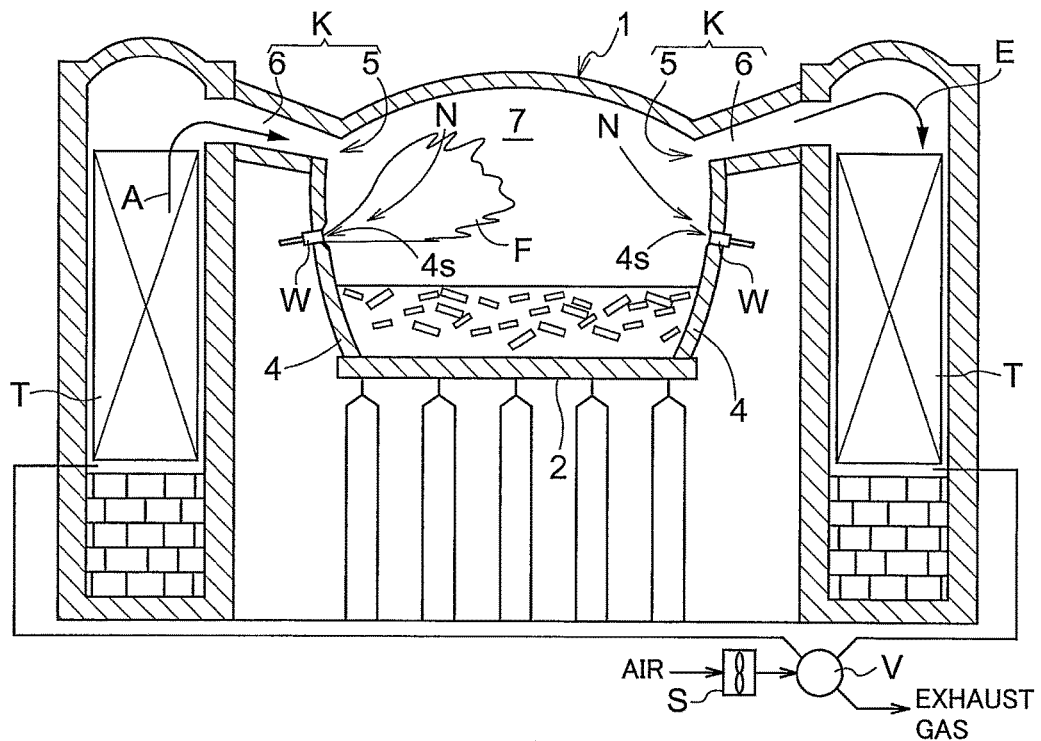
FIG. 3 is a front surface view of a longitudinal section (cross section in a medial position in the movement direction of an object to be melted)

The glass-melting furnace as the melting furnace comprises a rectangular melting zone 2 as viewed from above (as viewed in the vertical direction) in the lower part of a furnace body 1 having a ceiling formed in an arcuate shape, as shown in FIGS. 1 and 2. A charging port 4i for inputting glass material as the object to be melted is formed in the front surface part of a furnace wall 4 for partitioning and forming the melting zone 2, and an extraction port 4e for extracting melted glass is formed in the rear surface part of the furnace wall 4. The glass-melting furnace has, on the outside of the furnace wall portion in which the extraction port 4e is formed, a work chamber 3 in communication with the melting zone 2 by way of the extraction port 4e, and has a combustion device N for a melting furnace provided to both lateral locations of the melting zone 2 and is used for combusting gas fuel in a combustion space above the area in which an object to be melted is present in the melting zone 2. The glass-melting furnace is thereby configured so that glass material inputted from the charging port 4i is made to flow toward the work chamber 3 while being dissolved in the melting zone 2, and then made to pass through the extraction port 4e so that pure melted glass is directed to the work chamber 3.

Figure 5:
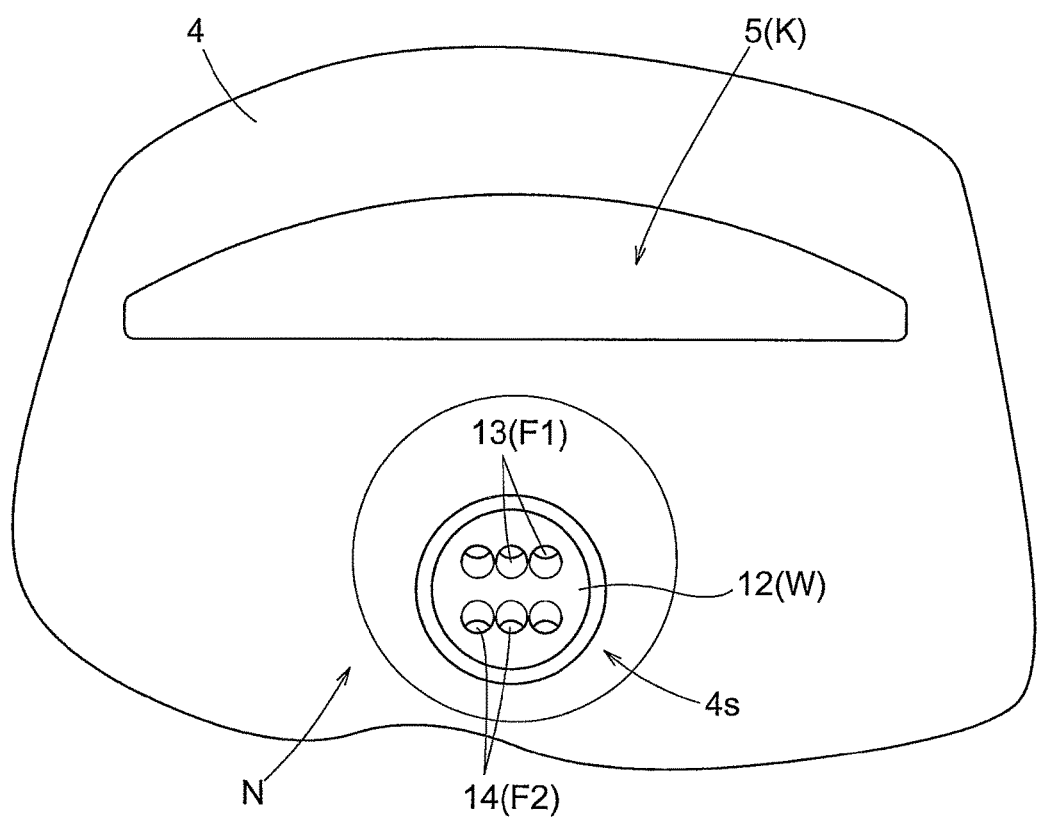
FIG. 5 is a side view of the main parts in a glass-melting furnace.

As shown in FIG. 1, three combustion devices N are provided in a line along the direction (the direction of flow of the glass material; the crosswise direction in FIG. 5) in which the charging port 4i and the extraction port 4e are lined up on each of the left and right side parts of the melting zone 2. The three combustion devices N on the left side and the three combustion devices N on the right side in FIG. 1 are configured to combust in alternating fashion every fixed period of time (e.g., about 15 to 30 minutes).

A regenerator T extending in the longitudinal direction of the melting furnace is provided to each of the left and right exterior side parts (crosswise direction in FIG. 5) of the furnace body 1, as shown in FIG. 1. As later described, the combustion devices N are configured so as to combust gas fuel in combustion air A that has passed through the regenerator T and been preheated to a high temperature (1,000 to 1,300° C.).

Combustion is carried out by the combustion devices N, and exhaust gas E thereafter passes through the regenerator T, which thereby stores the heat held by exhaust gas E.

Each of the combustion devices N is provided with a fuel feeder W for ejecting gas fuel from a lateral location in the combustion space into the combustion space, and a combustion air feeder K disposed in an location above the fuel feeder W and used for feeding combustion air A obliquely downward to the combustion space, as shown in FIG. 5

The combustion air feeder K is composed of an air port 5 opened in the furnace wall 4, and an air feed channel 6 in communication with the regenerator T and the air port 5; and is configured to feed combustion air A through the regenerator T to be preheated to a high temperature and then fed to the gas fuel combustion area, as described above. The speed at which the combustion air A is fed is, e.g., 8 to 15 m/s.

The cross-sectional shape of the air feed channel 6 and the shape of the air port 5 at the distal end thereof is a cylindrical shape (dome shaped) formed in a state provided with a rectilinear lower edge and a curve-shaped upper edge protruding upward and connecting the two ends of the rectilinear lower edge, as shown in FIG. 5.

The lower edge portion of the air feed channel 6 slopes downward 10 degrees with respect to the horizontal direction (crosswise direction in FIG. 1) as viewed from the side (as viewed in the depth direction of the plane of the drawing of FIG. 1), and the top portion of the upper edge of the air feed channel 6 is formed so as to slope downward 20 degrees with respect to the horizontal direction (the crosswise direction in FIG. 1) as viewed from the side (the depth direction of the plane of the drawing of FIG. 1).

As shown in FIG. 1, a flow channel switching mechanism V is provided for switching between a state in which air from a fan S is fed to a first lateral regenerator T and exhaust gas E exhausted from a second regenerator T is exhausted to the exterior, and a state in which air from the fan S is fed to the second lateral regenerators T and exhaust gas exhausted from the first regenerator T is exhausted to the exterior. The flow channel switching mechanism V is configured to switch between a state for feeding combustion air A to the three combustion devices N on the left side and a state for feeding combustion air A to the three combustion devices N on the right side, to thereby switch between a state in which the three combustion devices N on the left side are made to combust and a state in which the three combustion devices N on the right side are made to combust, as described above.

Figure 6:
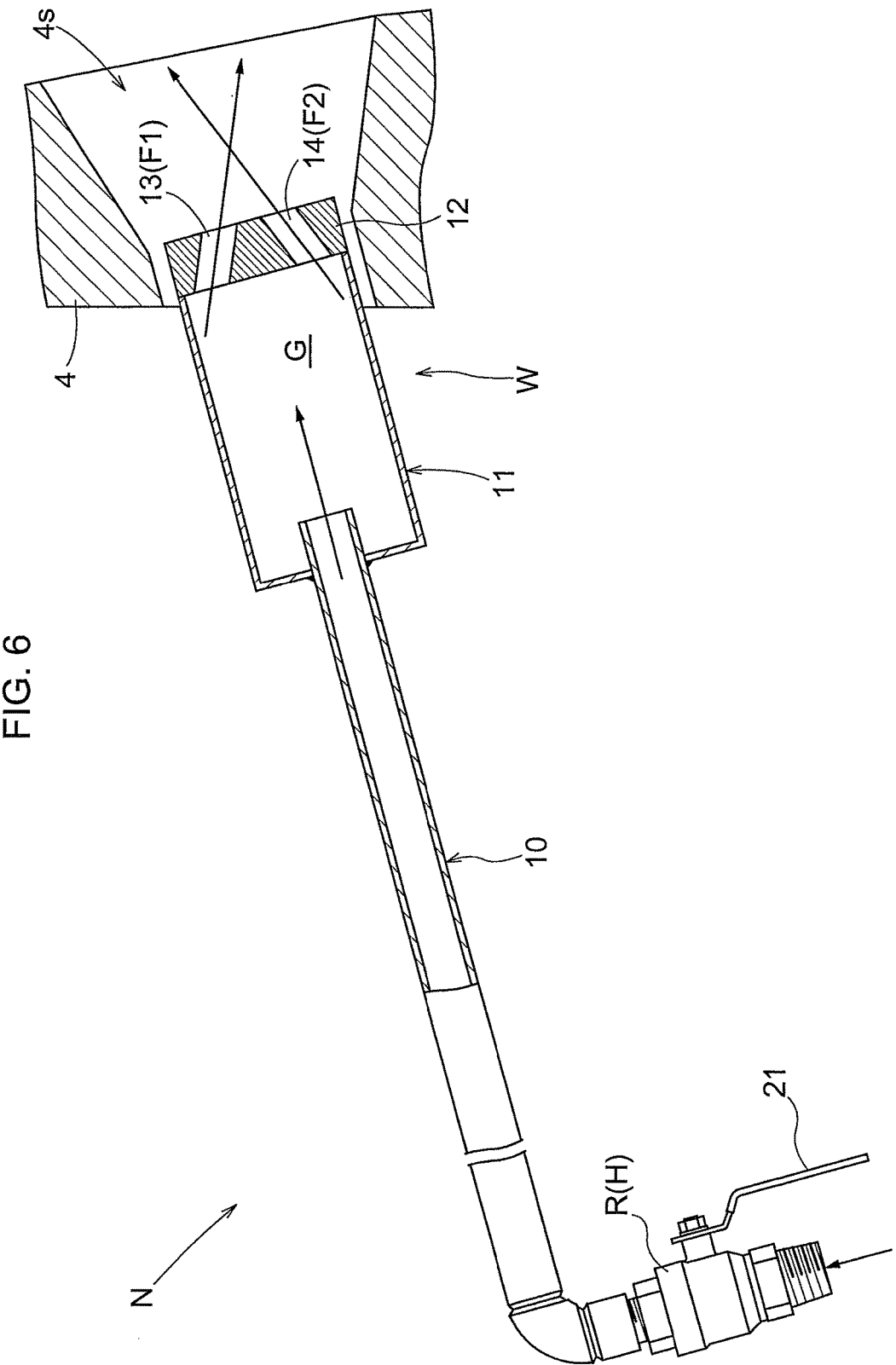
FIG. 6 is a partially cutaway side view of a fuel feeder.

The fuel feeder W is composed of a gas feed tube 10 to which gas fuel is fed from a gas fuel feed source, a gas feed chamber 11 connected to the distal end of the gas feed tube 10, and a fuel ejection nozzle 12 connected to the distal end of the gas feed chamber 11 and used for ejecting gas fuel into the combustion space, as shown in FIG. 6.

In other words, the fuel feeder W is configured as a unit in which the gas feed tube 10, the gas feed chamber 11, and the fuel ejection nozzle 12 are integrally assembled, and is attached to the furnace wall 4 in a state in which the fuel ejection nozzle 12 has been inserted into a furnace wall through-hole 4s of the furnace wall 4.

The fuel feeder W is attached so that the lengthwise direction of the gas feed tube 10 slopes upward 5 to 15 degrees with respect to the horizontal direction (the depth direction of the plane of the drawing of FIG. 5). This is a 10-degree upward slope in the example drawing of the present embodiment.

Figures 7, 8:
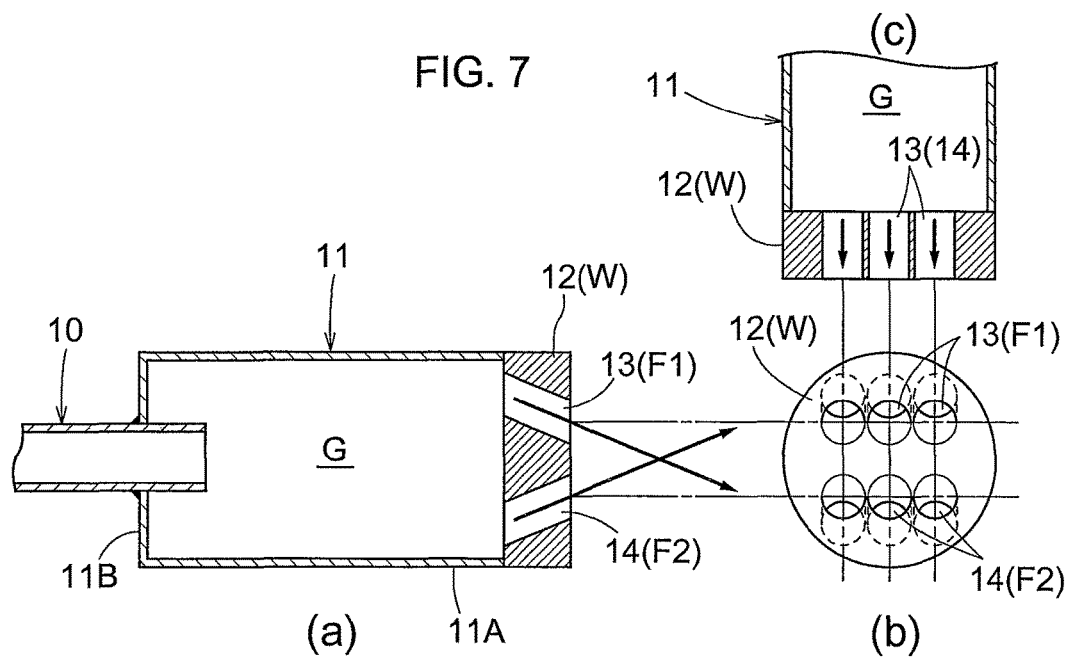
FIG. 7 is a detailed view showing the configuration of the gas feed chamber and the fuel ejection nozzle.
FIG. 8 is a descriptive view indicating the state of each flame formed by differently shaped nozzles.

As shown in FIGS. 6 and 7, two fuel ejectors F1, F2 are formed in the fuel ejection nozzle 12 in a line in the vertical direction (vertical direction in FIG. 5) as viewed in the lengthwise direction (depth direction of the plane of the drawing of FIG. 5) of the fuel ejectors, and the two fuel ejectors F1 and F2 are each provided with a plurality (three, in this example) of fuel ejection orifices 13, 14 in a line (the crosswise direction in FIG. 5) as viewed in the lengthwise direction of fuel ejection (the depth direction of the plane of the drawing of FIG. 5).

Figure 11:
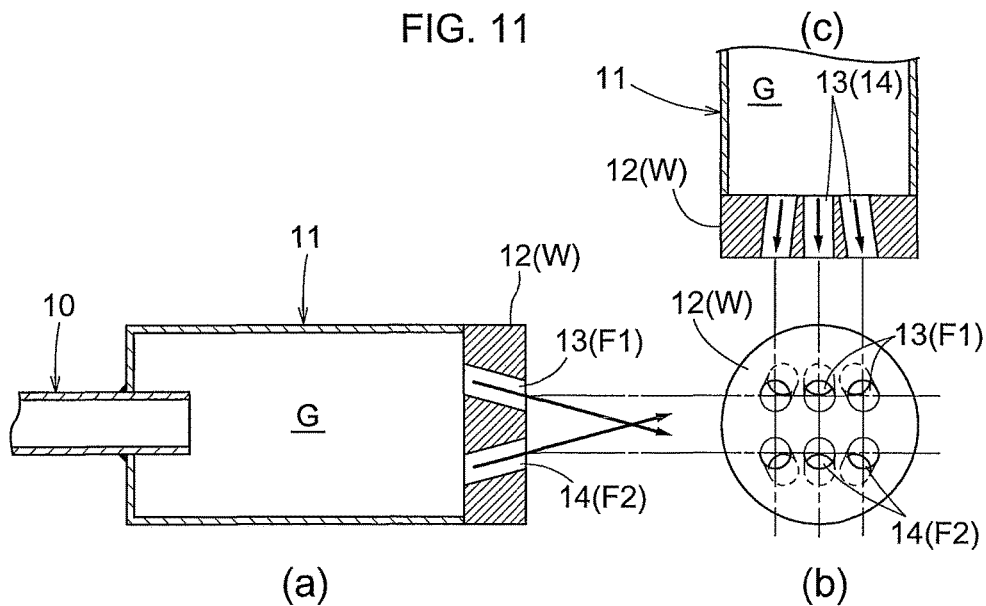
FIG. 11 is a detailed view showing the configuration of the gas feed chamber and the fuel ejection nozzle in another embodiment.
Figure 12:
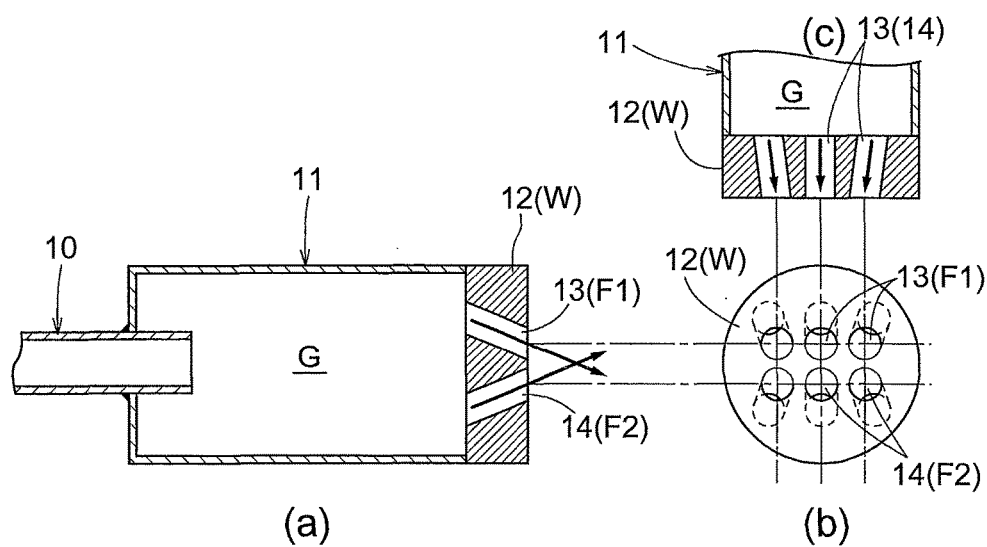
FIG. 12 is a detailed view showing the detail of the gas feed chamber and the fuel ejection nozzle in another embodiment.
Figure 13:
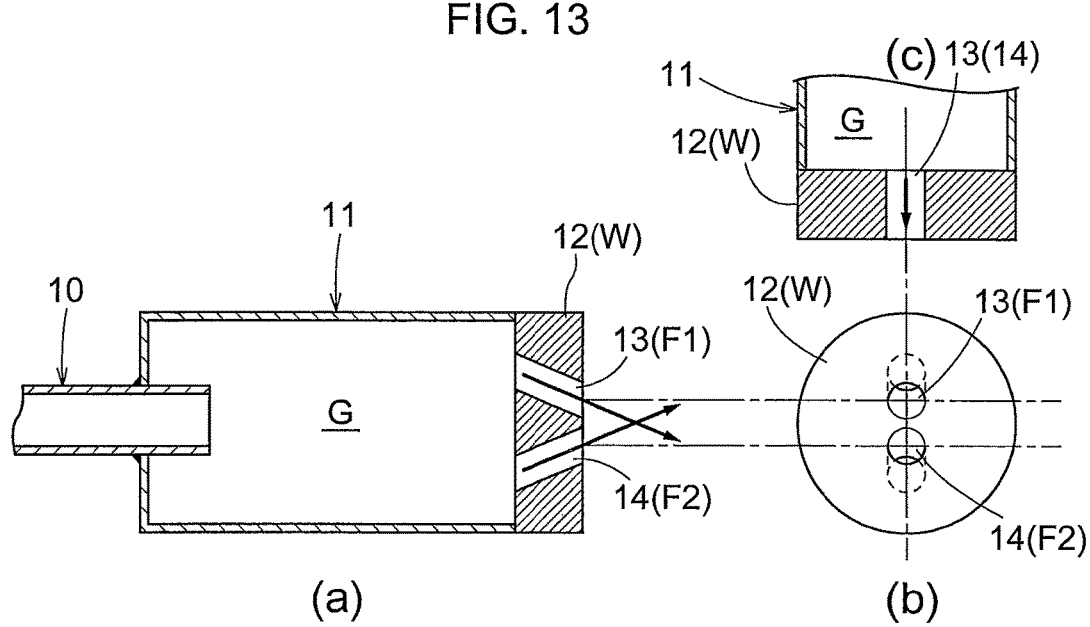
FIG. 13 is a detailed view showing the configuration of the gas feed chamber and the fuel ejection nozzle in another embodiment.

FIG. 7 shows a side view (FIG. 7(a), as viewed in the crosswise direction of FIG. 5) of the gas feed tube 10, the gas feed chamber 11, and the fuel ejection nozzle 12 in the left side of the drawing; shows a plan view (FIG. 7(c) as viewed in the vertical direction of FIG. 5) of the gas feed chamber 11 and the fuel ejection nozzle 12 in the upper right side of the drawing; and shows a front view (FIG. 7(b) as viewed in the depth direction of the plane of the drawing of FIG. 5) of the fuel ejection nozzle 12 in the lower right side of the drawing (as the same applies to FIGS. 11, 12, and 13).

The fuel ejection orifices 13, 14 of the two fuel ejectors F1, F2 are formed so that the ejection streams from the fuel ejection orifices 13, 14 collide on the downstream side of ejection as viewed from the side (as viewed from the crosswise direction of FIG. 5)

Here, with regards to the fuel ejectors F1, F2 and the fuel ejection orifices 13, 14, the fuel ejector F1 and the fuel ejection orifices 13 are positioned above in the vertical direction (on one side of the specific direction), and therefore constitute an upper fuel ejector (an example of a first fuel ejector) and upper fuel ejection orifices (an example of first ejection orifices) in the present embodiment. The fuel ejector F2 and the fuel ejection orifices 14 are positioned below in the vertical direction (on the other side of the specific direction), and therefore constitute a lower fuel ejector (an example of a second fuel ejector) and lower fuel ejection orifices (an example of second ejection orifices) in the present embodiment.

The fuel ejection orifices 13, 14 in the two fuel ejectors F1, F2 are formed so that the direction of fuel ejection is obliquely downward for the fuel ejector F1 and the fuel ejection orifices 13 and obliquely upward for the fuel ejector F2 and the fuel ejection orifices 14.

The fuel ejection orifices 13, 14 of the two fuel ejectors F1, F2 are also formed so that the lengthwise directions thereof are in parallel lines in a plan view (as viewed in the vertical direction of FIG. 5), as shown in FIG. 7.

The fuel ejection orifices 13, 14 of the two fuel ejectors F1, F2 are formed so that the hole diameters thereof are the same and so that the length of the holes is twice or greater than the diameter of the holes.

The gas feed chamber 11 is formed having a fuel feed chamber G that is shared by the two fuel ejectors F1, F2 in the fuel ejection nozzle 12, as shown in FIGS. 6 and 7.

Specifically, openings at the distal end of a cylindrical main unit 11A are connected to the rear surface of the fuel ejection nozzle 12, and a rear wall 11B to which the gas feed tube 10 is connected is provided to the rear part of the cylindrical main unit 11A.

The gas feed tube 10 is connected to a connecting part of the gas feed tube (not shown) at the base end side thereof, and the distal end side thereof is connected to the fuel feed chamber G in the gas feed chamber 11. A flow rate regulation valve R provided with an operation lever 21 for regulating the flow rate is disposed at the base end of the gas feed tube 10.

The flow rate regulation valve R constitutes flow rate modification and adjustment means H for modifying and adjusting the gas fuel amount ejected from the two fuel ejectors F1, F2 in the fuel ejection nozzle 12.

The gas flow rate from the two fuel ejectors F1, F2 in the fuel ejection nozzle 12 of the combustion devices N, in which three are provided to each of the two left and right side parts of the melting zone 2, is set in the following manner by the flow rate modification and adjustment means H.

In other words, the amount of gas fuel fed to the three combustion devices N provided in a line along the direction in which the charging port 4i and the extraction port 4e are lined up (the direction of flow of the glass material; the crosswise direction in FIG. 5) is set to increase in progress from the side near the charging port 4i toward the extraction port 4e.

Therefore, the length of the flames formed by the combustion devices N varies, as shown in FIGS. 1 to 4, such that the flame formed by the combustion device N nearest to the charging port 4i is shorter than the flame formed by the combustion device N intermediately disposed between the charging port 4i and the extraction port 4e, and the flame formed by the intermediately disposed combustion device N is shorter than the flame formed by the combustion device N nearest to the extraction port 4e.

The object to be melted (glass material) is present in a concavo-convex state in the vertical direction prior to melting in the area near the charging port 4i. Therefore, it is preferred that the combustion flame essentially extend obliquely upward in order to prevent the combustion flame from making contact with the object to be melted (glass material). In the present embodiment, the combustion flame in a state extending obliquely upward can be formed by adjusting the amount gas fuel in the combustion devices N near the charging port 4i.

Also, the melted upper surface of the object to be melted (glass material) is essentially flat in the area near the extraction port 4e, and it is preferred that the flame extend considerably along the upper surface of the object to be melted in order to allow the entire object to be melted (glass material) to be uniformly heated by the combustion flame. In the present embodiment, a combustion flame in a state of being longer toward the horizontal direction (the crosswise direction of FIG. 4) can be formed by the combustion device N nearest to the extraction port 4e.

In the intermediate area between the charging port 4i and the extraction port 4e, the partially melted object to be melted (glass material) is essentially not as large as in the area near the charging port 4i, but is present in a concavo-convex state in the vertical direction. Therefore, the combustion flame is not required to be set upward more greatly than the area near the charging port 4i, but it is preferred that the combustion flame extend obliquely upward in order to prevent the combustion flame from making contact with the object to be melted (glass material). In the present embodiment, the amount of gas fuel is adjusted and a combustion flame can thereby be formed: in a state in which the combustion flame formed by the combustion device N intermediately disposed between the charging port 4i and the extraction port 4e is not aimed more greatly upward than the combustion flame formed by the combustion device N near the charging port 4i, and in a state in which a combustion flame can be formed so as to extend obliquely upward and yet be no longer than the combustion flame formed by the combustion device N near the extraction port 4e; and the length in progress toward substantially the horizontal direction (the crosswise direction of FIG. 3) can be increased.

In other words, each of the three combustion devices N lined up along the direction in which the charging port 4i for inputting raw material into the melting zone 2 and the extraction port 4e for extracting the melted object are lined up (the crosswise direction of FIG. 5) can form desired combustion flames in the melting furnace.

It is furthermore apparent from FIG. 6 that, in the furnace wall through-hole 4s in which the fuel ejection nozzle 12 is provided, the cross-sectional area of the furnace wall through-hole 4s increases in progress from the distal end of the fuel ejection nozzle 12 toward the inside end face of the melting furnace, and the collision position of the upper ejection stream ejected from the fuel ejector F1 (upper fuel ejector) and the lower ejection stream ejected from the fuel ejector F2 (lower fuel ejector) is set further to the inner side of the furnace wall than the inside end face of the melting furnace.

Figure 4:
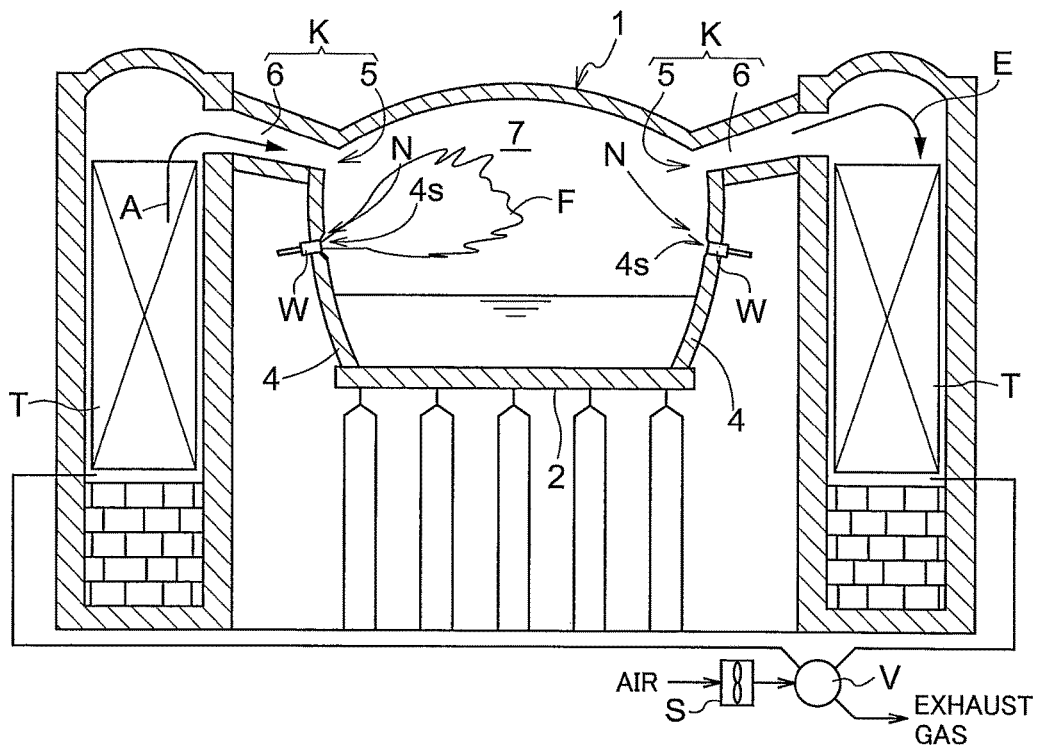
FIG. 4 is a front surface view of a longitudinal section (cross section on the extraction port side) of a glass-melting furnace.

It is furthermore apparent from FIG. 4 and other drawings that, in relation to the fuel feeder W, the combustion air feeder 6 of the combustion devices N on one side is opened in the distal end side in the axial direction (essentially, the axial distal end of the fuel feeder W) of the flame formed by combustion of gas fuel ejected from the fuel feeder W of the combustion devices N on the other side.

[Experiment Results]

Described next are experiment results of mounting the fuel feeder W described in the embodiment above in an experimental heating furnace and carrying out combustion.

The experimental heating furnace had a depth D of 8.8 m, a height Y of 1.6 m, and a width L of 1.8 m.

The cross-sectional shape of the air port for feeding combustion air A and the air feed channel continuous to the air port was a rectangular shape long in the lateral direction. Specifically, the lateral width was 0.9 m, the height was 0.45 m, the lower surface of the air feed channel sloped downward 10 degrees with respect to the horizontal direction (the crosswise direction of FIG. 1), and the upper surface sloped downward 20 degrees with respect to the horizontal direction (the crosswise direction of FIG. 1). This structure shows that the shape of the opening of the air port varied with respect to the shape of the main part of the furnace shown in FIG. 5.

The combustion air A was air at 1,000° C. and fed at 4 m/s.

A damper for adjusting exhaust resistance was provided to the flue through which the exhaust gas flows, and the bottom part of the heating furnace was formed simply as the floor surface.

The results of making various modifications to the nozzle provided to the fuel feeder W in such an experimental apparatus will be described with reference to FIGS. 8, 9, and 10.

FIG. 8 shows the various types of nozzles used in the study, the shapes of the holes as viewed from the front (the depth direction of the plane of the drawing of FIG. 5), and the shapes of the formed flames (as viewed from above (as viewed in the vertical direction of FIG. 5), and as viewed from the side (as viewed in the horizontal direction of FIG. 5)). In the drawing, in the column with the shape of the flames as viewed from above in FIG. 8, the upper side is the distal end side of the flames, and in the column with the shape of the flames as viewed from the side in FIG. 8, the left side is the distal end side of the flames.

The types of nozzles included a round-hole nozzle, an oval-hole nozzle having a major axis in the horizontal direction (the crosswise direction of FIG. 5), a flat-flame nozzle in which nozzles having a plurality of small-diameter holes in the horizontal direction (the crosswise direction of FIG. 5) are disposed in two rows above and below each other, and an impinging jet nozzle according to the present invention in which three nozzles having an intermediate diameter in the horizontal direction (the crosswise direction of FIG. 5) are disposed in two rows above and below each other.

As a result of the study, as shown in FIG. 8, the round-hole nozzle formed a flame that extended in rectilinear fashion in the axial direction of the flame as viewed from above and the side; and the oval-hole nozzle formed a flame that widened flatly in the horizontal direction, as apparent from the view from above, and a flame that did not widen in the vertical direction, as apparent from the view from the side. In contrast to these nozzles, the flat-flame nozzle formed a flame that widened in the horizontal direction and the vertical direction, but the impinging jet nozzle of the present embodiment allowed the flame to widen in the vertical direction (the vertical direction of FIG. 5) while the convergent state thereof was relatively maintained in the horizontal direction (the crosswise direction in FIG. 5).

Figure 9:
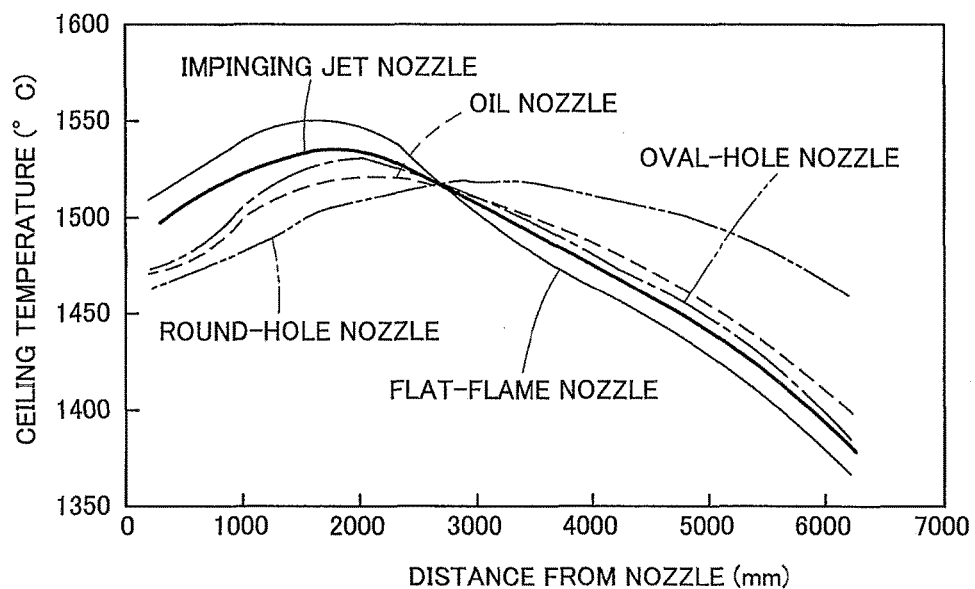
FIG. 9 is a diagram showing the temperature distribution of the furnace ceiling heated by differently shaped nozzles.
Figure 10:
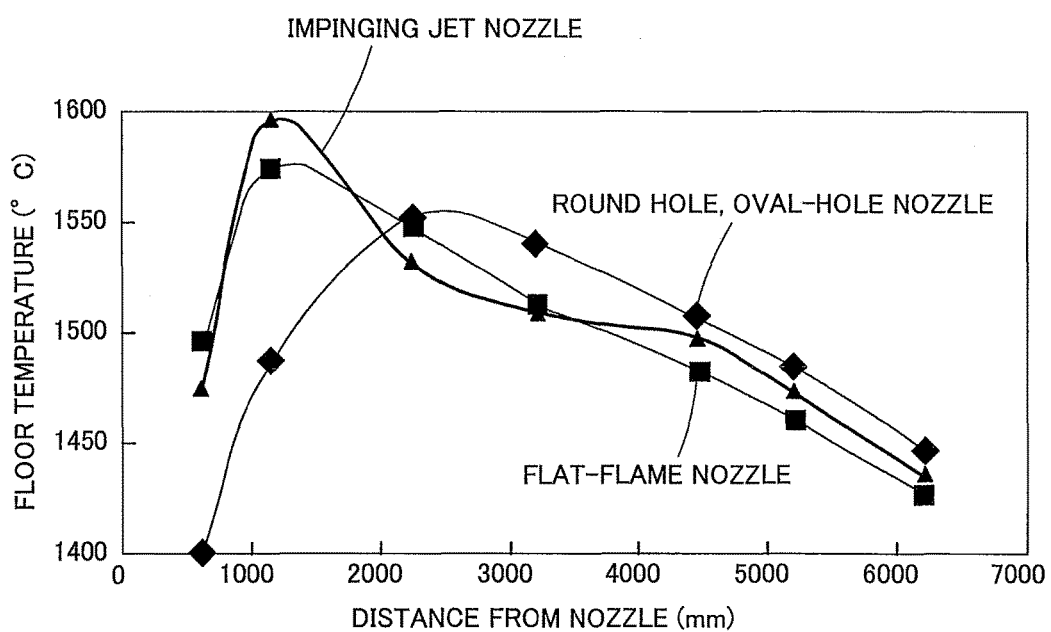
FIG. 10 is a diagram showing the temperature distribution of the furnace floor heated by differently shaped nozzles.

The ceiling temperature and the floor temperature of the experimental heating furnace were measured for each of the nozzles and the results are shown in FIGS. 9 and 10. An oil nozzle, shown in FIG. 9, in which heavy fuel oil or another liquid fuel is used as the fuel has conventionally been used in a glass-melting furnace.

It is apparent in the experiment results that the impinging jet nozzle according to the present invention suitably heated the position nearest from the nozzles (the position nearest from the furnace wall in a state installed in the furnace) in terms of the ceiling temperature and the floor temperature.

As a result of measuring the NOx of exhaust gas flowing through the flue, the levels were within the permitted concentration.

(Another Embodiment of the Fuel Feeder)

Described next is another embodiment of the fuel feeder W.

In this embodiment, two fuel ejectors F1, F2 constituting a pair are formed in a line in the vertical direction (an example of the specific direction as viewed in the lengthwise direction of fuel ejection) in the same manner as the embodiment described above, and fuel ejection orifices 13, 14 of the fuel ejectors F1, F2 constituting a pair are formed in a state in which the jets collide on the downstream side of the jets as viewed from the side (as viewed in the crosswise direction of FIG. 5), and the feature in which three fuel ejection orifices 13, 14 are formed in each of the nozzles is the same as the embodiment described above, as shown in FIGS. 11 and 12.

A feature that differs from the embodiment described above is that the three fuel ejection orifices 13, 14 provided to each of the fuel ejectors F1, F2 are configured so as to widen in a radial fashion to the ejection side, as shown in the plan view in the example of FIG. 11 (FIG. 11(*c*) is a view as seen in the vertical direction of FIG. 5), and are configured so as to converge within a predetermined range on the ejection side as shown in the plan view in the example of FIG. 12 (FIG. 12(*c*) is a view as seen in the vertical direction of FIG. 5).

In this embodiment, the fuel ejectors F1, F2 constituting a pair in the same manner as the embodiment described above are formed in a line in the vertical direction (an example of the specific direction as viewed in the lengthwise direction of fuel ejection), as shown in FIG. 13, and the fuel ejection orifices 13, 14 of the fuel ejectors F1, F2 constituting a pair are formed in a state in which the jets collide on the downstream side of the jets as viewed from the side (as viewed in the vertical direction of FIG. 5) in the same manner as the embodiment described above.

A feature that differs from the embodiment described above is that the number of fuel ejection orifices 13, 14 provided to each of the fuel ejectors F1, F2 is a single ejection orifice in the example shown in FIG. 13.

Figure 14:
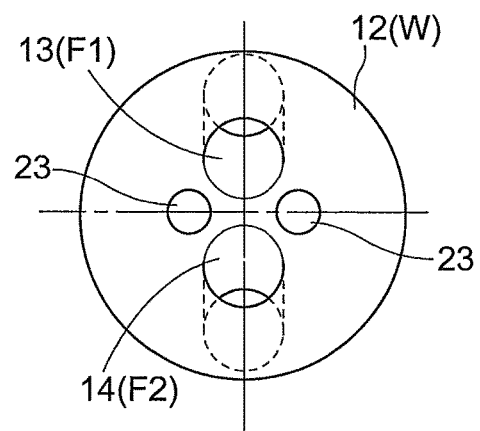
FIG. 14 is a front surface view of the fuel ejection nozzle in yet another embodiment provided with auxiliary flame holes.

In the present embodiment, the fuel ejectors F1, F2 constituting a pair are formed in a line in the vertical direction (an example of the specific direction as viewed in the lengthwise direction of fuel ejection), as shown in FIG. 14, and the fuel ejection orifices 13, 14 of the fuel ejectors F1, F2 constituting a pair are formed in a state in which the jets collide on the downstream side of the jets as viewed from the side (as viewed in the crosswise direction of FIG. 5), in the same manner as the embodiment shown in FIG. 13. The number of fuel ejection orifices 13, 14 provided to the fuel ejectors F1, F2 is the same in that there is a single fuel ejection orifice provided to each in the example shown in FIG. 14.

A feature that differs from the embodiment shown in FIG. 13 is that the fuel ejectors F1, F2 are provided with auxiliary ejection orifices 23, 23 that are positioned in a medial position in the vertical direction (the specific direction as viewed in the lengthwise direction of fuel ejection) between the first fuel ejection orifice 13 (upper fuel ejection orifice) and the second fuel ejection orifice 14 (lower fuel ejection orifice), in relation to the fuel ejection orifices 13, 14 constituting a pair in the vertical direction (the specific direction as viewed in the lengthwise direction of fuel ejection), and that are positioned to both sides in the horizontal direction (the orthogonal direction orthogonal to the specific direction as viewed in the lengthwise direction of fuel ejection), in relation to the fuel ejection orifices 13, 14 constituting a pair in the vertical direction (the specific direction as viewed in the lengthwise direction of fuel ejection). The auxiliary ejection orifices 23, 23 are also fed with gas fuel from the gas feed tube (not shown) and the gas feed chamber (not shown). The auxiliary ejection orifices 23, 23 eject gas fuel, are set so that the direction in which gas fuel is ejected is the vertically intermediate direction (front/back direction of the plane of the drawing in FIG. 14, and the direction that does not slope upward or downward), and are provided in a crosswise position and parallel to the horizontal direction (the horizontal direction of FIG. 14) of the collision position of the ejection streams ejected from the fuel ejection orifices 13 (upper fuel ejection orifices) and the fuel ejection orifices 14 (lower fuel ejection orifices) so as to have a smaller diameter flame port than the fuel ejection orifices 13, 14. As a result, the distal end of the fuel feeder W can be cooled.

Such auxiliary ejection orifices are provided in the embodiment shown in FIG. 13, and can also be provided to the embodiments described above.

In the embodiments described above, a configuration was used for feeding gas fuel from a single gas feed chamber to the fuel ejector F1 (upper fuel ejector) and the fuel ejector F2 (lower fuel ejector), i.e., the fuel ejection orifices 13 (upper fuel ejection orifices) and the fuel ejection orifices (lower fuel ejection orifices 14). In this configuration, the amount of gas fuel ejected from the fuel ejectors F1, F2, i.e., the fuel ejection orifices 13, 14 is about the same. Therefore, the shape of the flame to be formed, i.e., the direction is essentially determined by the direction in which the fuel feeder W slopes.

In contrast to such a configuration, the direction of the jet after collision, i.e., the direction in which the flame is formed can be adjusted when a configuration is used that allows adjustment to the flow rate of the gas fuel fed, i.e., ejected between the fuel ejector F1 (upper fuel ejector) and the fuel ejector F2 (lower fuel ejector), i.e., the fuel ejection orifices 13 (upper fuel ejection orifices) and the fuel ejection orifices (lower fuel ejection orifices 14).

Figure 15:
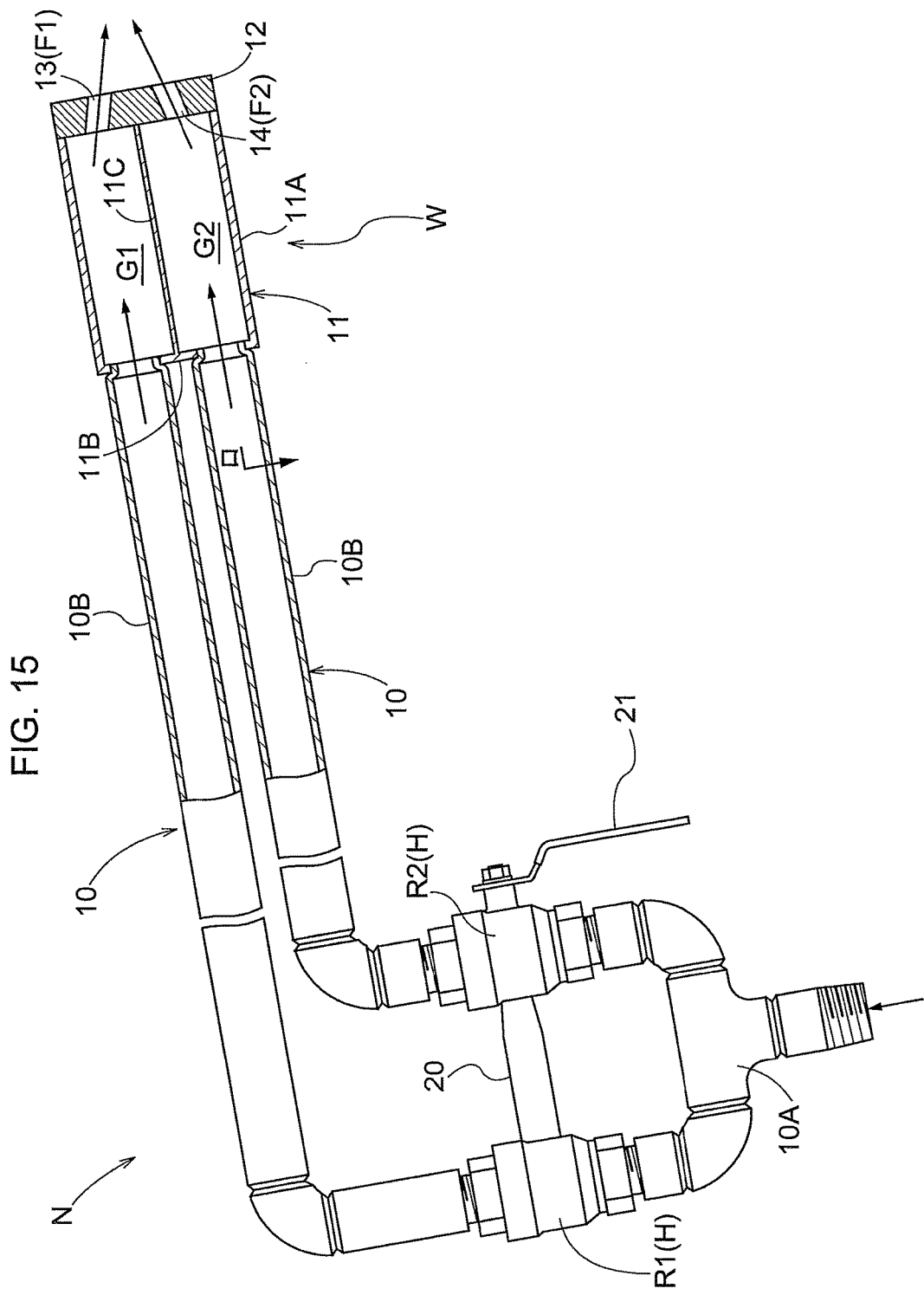
FIG. 15 is a view showing the configuration of a fuel feeder capable of adjusting the fuel ejection amount using an upper fuel ejection orifice and a lower fuel ejection orifice.

An embodiment of such a fuel feeder W is shown in FIG. 15. The difference from the embodiment shown in FIG. 6 is that the flow rate modification and adjustment means H is configured using flow rate regulation valves R1, R2 disposed between a single shared base end-side tube 10A and a pair of tube channel portions 10B.

In other words, the pair flow rate regulation valves R1, R2 are linked so as to be integrally (simultaneously) opened and closed by a connecting shaft 20, and a reciprocating swing-operated operation lever 21 for integrally (simultaneously) opening and closing the flow rate regulation valves R1, R2 is provided. The flow rate regulation valves R1, R2 are configured so that the degree of opening of a first valve is increased as the degree of opening of the second valve is reduced in commensurate fashion with the extent that the operation lever 21 is swung in one direction, the flow rate regulation valves R1, R2 are configured so that the degree of opening of the second valve is increased as the degree of opening of the first valve is reduced in commensurate fashion with the extent that the operation lever 21 is swung in the other direction, and the degree of opening is changed in the opposite direction.

Using such a configuration makes it possible to adjust the flow rate of the gas fuel fed, i.e., ejected between the fuel ejector F1 (upper fuel ejector) and the fuel ejector F2 (lower fuel ejector), i.e., the fuel ejection orifices 13 (upper fuel ejection orifices) and the fuel ejection orifices (lower fuel ejection orifices 14).

As described above, the object to be melted (glass material) is present in a concavo-convex state in the vertical direction prior to melting in the area near the charging port 4i. Therefore, it is preferred that the combustion flame extend obliquely upward in order to prevent the combustion flame from making contact with the object to be melted (glass material).

Also, the melted upper surface of the object to be melted (glass material) is flat in the area near the extraction port 4e. Therefore, it is preferred that the combustion flame extend considerably along the upper surface of the object to be melted in order to allow the entire object to be melted (glass material) to be uniformly heated by the combustion flame.

In the intermediate area between the charging port 4i and the extraction port 4e, the partially melted object to be melted (glass material) is not as large as in the area near the charging port 4i, but is present in a concavo-convex state in the vertical direction. Therefore, the combustion flame is not required to be set upward more greatly than the area near the charging port 4i, but it is preferred that the combustion flame extend obliquely upward in order to prevent the combustion flame from making contact with the object to be melted (glass material).

The use of a fuel feeder W capable of individually or mutually adjusting the amount of gas fuel in the flame position near the charging port 4i, near the extraction port 4e, and in a medial position between the ports makes it possible to advantageously adjust the amount of gas fuel fed to the fuel ejectors F1, F2 and the fuel ejection orifices 13, 14.

Figure 16:
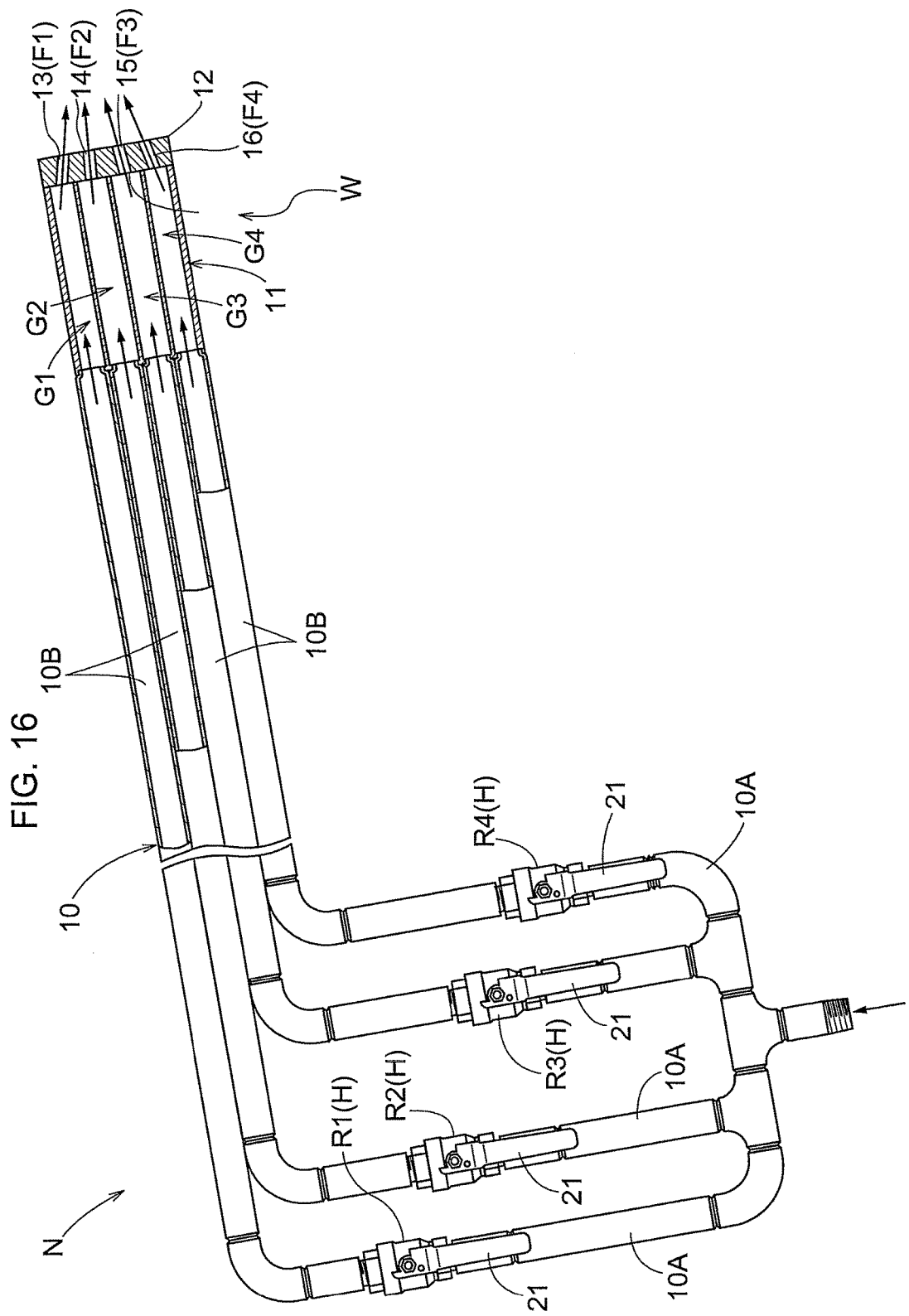
FIG. 16 is a view showing the configuration of a fuel feeder that is provided with four fuel ejection orifices in the vertical direction and that is capable of independently adjusting the fuel ejection amount.

In the embodiments described above, configurations in which the fuel ejectors F1, F2 constitute an upper and lower pair were described, but in the example shown in FIG. 16, four fuel ejectors F1, F2, F3, F4 are provided in the vertical direction (the vertical direction in FIG. 5), fuel ejection orifices 13, 14, 15, 16 are provided in corresponding fashion to the four fuel ejectors F1, F2, F3, F4, the jets from the upper two ejectors and the lower two ejectors are configured to collide, and the feed rate of the gas fuel to the four fuel ejectors F1, F2, F3, F4 and the fuel ejection orifices 13, 14, 15, 16 can be individually determined.

In other words, in this embodiment, four fuel ejectors F1, F2, F3, F4 are formed in a line in the vertical direction (the vertical direction of FIG. 5), as shown in FIG. 16, and each of the four fuel ejectors F1, F2, F3, F4 is provided with a plurality of fuel ejection orifices 13, 14, 15, 16 in a state lined up in the horizontal direction (the crosswise direction of FIG. 5) as viewed in the lengthwise direction of fuel ejection (as viewed in the depth direction of the plane of the drawing of FIG. 5). Additionally, the fuel ejector F1 is provided with a plurality of fuel ejection orifices 13 that are lined up in the horizontal direction as viewed in the lengthwise direction of fuel ejection. Similarly, the fuel ejector F2 is provided with a plurality of fuel ejection orifices 14, the fuel ejector F3 is provided with a plurality of fuel ejection orifices 15, and the fuel ejector F4 is provided with a plurality of fuel ejection orifices 16, The fuel ejection orifices 13, 14, 15, 16 of the four fuel ejectors F1, F2, F3, F4 are configured so that the jets from the upper two rows collide with the jets from the lower two rows as viewed from the side (as viewed in the crosswise direction of FIG. 5).

Also, in this embodiment, four tube portions 10B are provided, the gas feed chamber 11 is partitioned into four fuel chambers G1, G2, G3, G4, and four flow rate regulation valves R1, R2, R3, R4 constituting the flow rate modification and adjustment means H are provided so as to correspond to each to the above-described four tube portions 10B, respectively, each capable of being separately operated.

Yet another embodiment of the fuel feeder W will be described.

In this embodiment, fuel ejectors F1, F2 constituting a pair are formed in a line in a specific direction as viewed in the lengthwise direction of fuel ejection, and fuel ejection orifices 13, 14 in the fuel ejectors F1, F2 constituting a pair are formed in a state in which jets collided on the downstream side of the jets, and three fuel ejection orifices 13, 14 are formed in each of the fuel ejectors in the same manner as the embodiments described above, as shown in FIGS. 17 and 18.

The configuration is different from the embodiments described above in that, in the example shown in FIGS. 17 and 18, the specific direction in which the fuel ejectors F1, F2 are disposed as viewed in the lengthwise direction of fuel ejection is the crosswise direction of FIG. 17 (the depth direction of the plane of the drawing of FIG. 1), and the orthogonal direction orthogonal to the specific direction as viewed in the lengthwise direction of fuel ejection is the vertical direction in FIG. 17 (the vertical direction in FIG. 1). In other words, the fuel ejectors F1, F2 shown in FIG. 5 are disposed so as position the fuel ejectors F1, F2 in positions rotated 90° to the right or the left about the center axis of the fuel ejection nozzle 12 as viewed in the lengthwise direction of fuel ejection.

Figure 17:
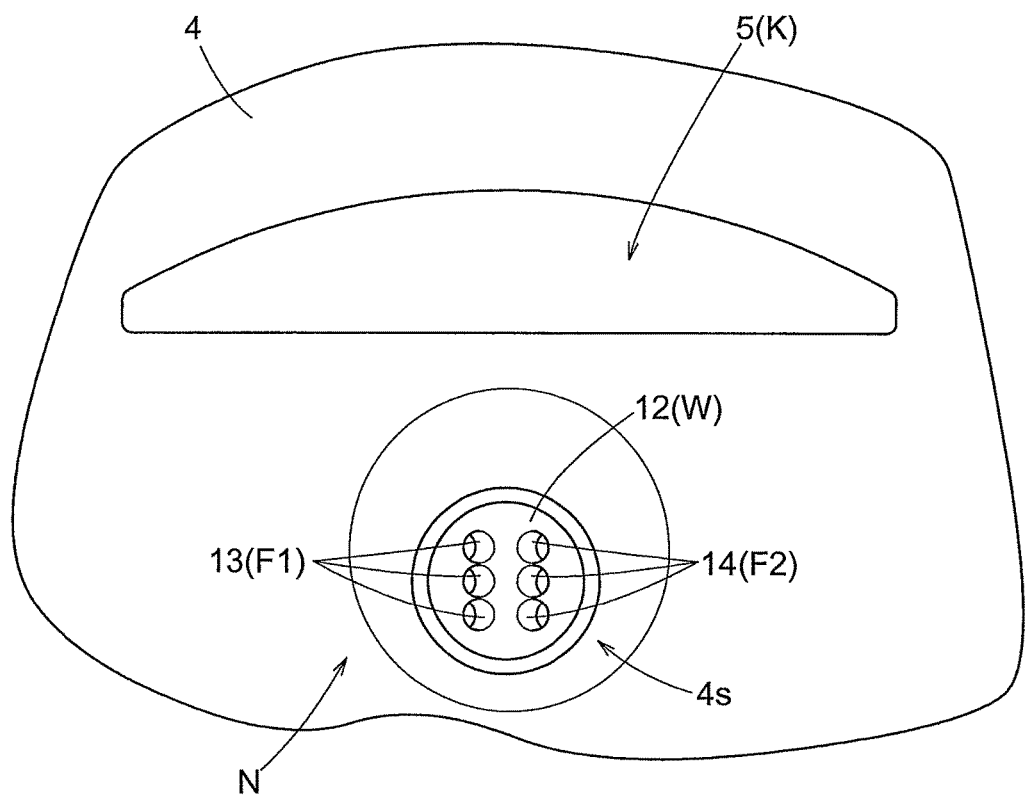
FIG. 17 is a side view of the main parts in a glass-melting furnace in another embodiment.
Figure 18:
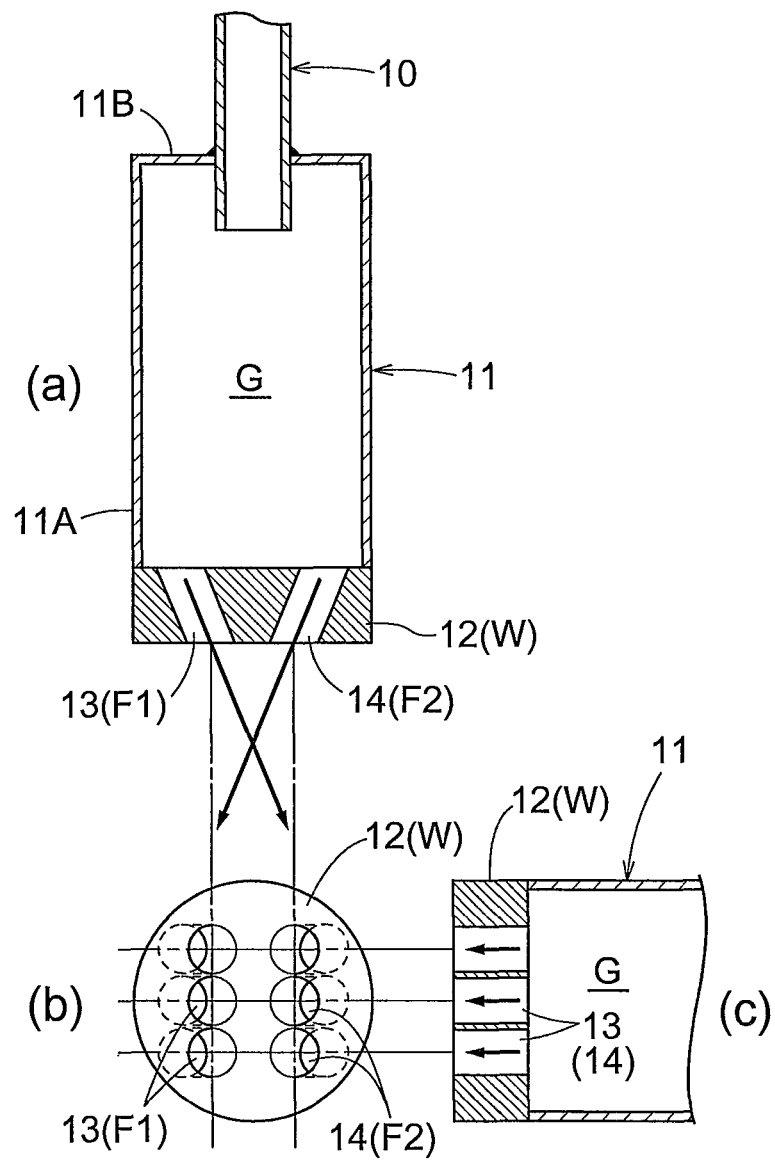
FIG. 18 is a detailed view showing the configuration of the gas feed chamber and the fuel ejection nozzle in another embodiment.

Specifically, two fuel ejectors F1, F2 are formed in a line in the fuel ejection nozzle 12 of this embodiment in the crosswise direction (the crosswise direction of FIG. 17) as viewed in the lengthwise direction of fuel ejection (as viewed in the depth direction of the plane of the drawing of FIG. 17), as shown in FIG. 18; and the two fuel ejectors F1, F2 are provided in a state in which a plurality (three, in this example) of the fuel ejection orifices 13, 14 are lined up in the vertical direction (the vertical direction in FIG. 17) as viewed in the lengthwise direction of fuel ejection (as viewed in the depth direction of the plane of the drawing of FIG. 17).

Figure 19:
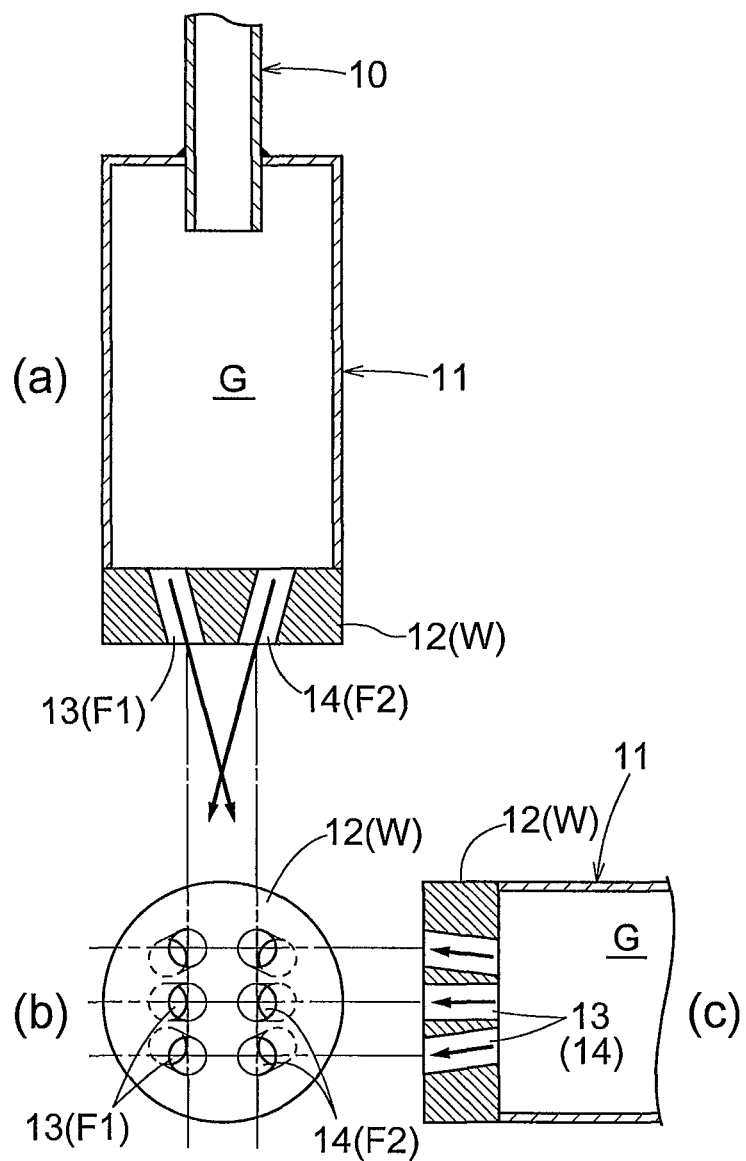
FIG. 19 is a detailed view showing the configuration of the gas feed chamber and the fuel ejection nozzle in another embodiment.
Figure 20:
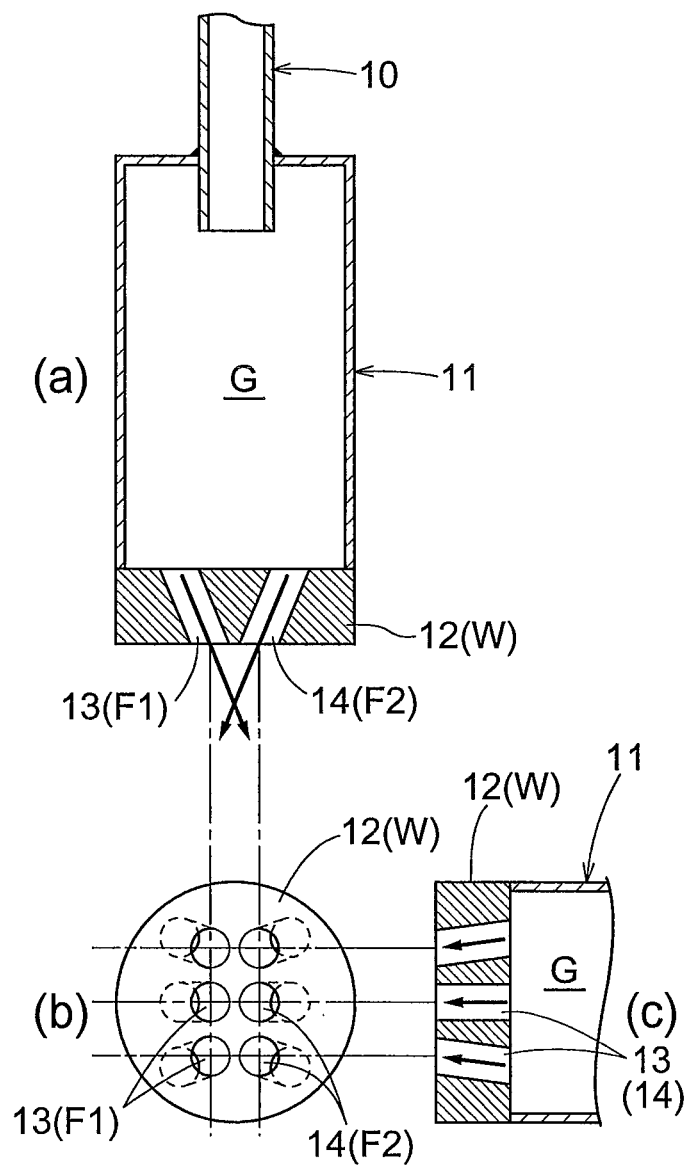
FIG. 20 is a detailed view showing the configuration of the gas feed chamber and the fuel ejection nozzle in another embodiment.
Figure 21:
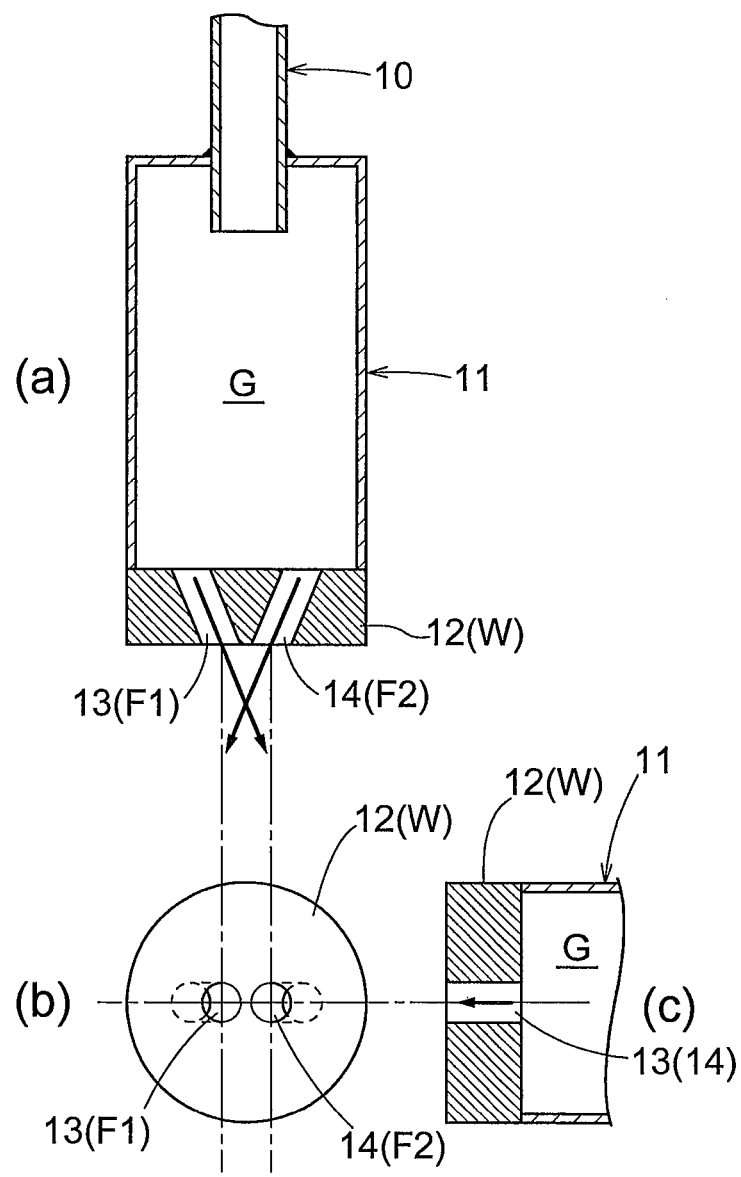
FIG. 21 is a detailed view showing the configuration of the gas feed chamber and the fuel ejection nozzle in another embodiment.

FIG. 18 shows a plan view (FIG. 18(a) as viewed in the vertical direction of FIG. 17) of the gas feed tube 10, the gas feed chamber 11, and the fuel ejection nozzle 12 in the upper side of the drawing, the gas feed chamber 11 and the fuel ejection nozzle 12 as viewed from the side (FIG. 18(c) as viewed in the crosswise direction of FIG. 17) are shown in the lower right of the drawing, and a frontal view of the fuel ejection nozzle 12 (FIG. 18(b) as viewed in the lengthwise direction of fuel ejection of FIG. 17) is shown in the lower left of the drawing (and the same applies to FIGS. 19, 20, and 21).

The fuel ejection orifices 13, 14 of the fuel ejectors F1, F2 are formed so that the ejection jets from the fuel ejection orifices 13, 14 collide on the downstream side of ejection as seen in a plan view (as viewed in the vertical direction of FIG. 17).

Here, in relation to the fuel ejectors F1, F2 and the fuel ejection orifices 13, 14, the fuel ejector F1 and the fuel ejection orifices 13 are positioned to the left (one side specific direction) in the crosswise direction (an example of the specific direction as viewed in the lengthwise direction of fuel ejection), as shown in FIG. 18(b), and therefore constitute a left fuel ejector (an example of the first fuel ejector) and left fuel ejection orifices (an example of the first fuel ejection orifices) in the present invention. The fuel ejector F2 and the fuel ejection orifices 14 are positioned to the right (a second specific direction) in the crosswise direction, and therefore constitute a right fuel ejector (an example of the second fuel ejector) and right fuel ejection orifices (an example of the second fuel ejection orifices) in the present invention.

The direction of fuel ejection of the fuel ejection orifices 13, 14 in the two fuel ejectors F1, F2 formed to be obliquely rightward for the fuel ejector F1 and the fuel ejection orifices 13, and obliquely leftward for the fuel ejector F2 and the fuel ejection orifices 14.

Furthermore, as shown in FIG. 18, the lengthwise directions of fuel ejected from the fuel ejection orifices 13, 14 in the two fuel ejectors F1, F2 are formed to be in parallel alignment as viewed from the side (as viewed in the crosswise direction of FIG. 17).

As shown in FIGS. 19 and 20, the fuel ejectors F1, F2 constituting a pair are configured in a line in the crosswise direction (an example of the specific direction as viewed in the lengthwise direction of fuel ejection) in this embodiment in the same manner as the embodiment described above (see FIGS. 17 and 18), and the fuel ejection orifices 13, 14 in the fuel ejectors F1, F2 constituting a pair are formed so that the jets collide on the downstream side of the jets as viewed from above (in the vertical direction in FIG. 17) and three fuel ejection orifices 13, 14 are formed in each fuel ejector. This feature is the same as in the embodiments described above.

The feature that differs from the embodiments described above is that the three fuel ejection orifices 13, 14 provided in each of the fuel ejectors F1, F2 are configured so as to be spread out in radial fashion to the ejection side in the side view in the example shown in FIG. 19 (FIG. 19(c) as viewed in the crosswise direction of FIG. 17), and are configured to converge within predetermined range on the ejection side in the side view in the example shown in FIG. 20 (FIG. 20(c) as viewed in the crosswise direction of FIG. 17).

In this embodiment, the fuel ejectors F1, F2 constituting a pair are formed in a line in the crosswise direction (an example of the specific direction as viewed in the lengthwise direction of fuel ejection) in the same manner as in the embodiments described above (see FIGS. 17 and 18), as shown in FIG. 21, and the fuel ejection orifices 13, 14 in the fuel ejectors F1, F2 constituting a pair are formed so that the jets collide on the downstream side of the jets as viewed from above (as viewed in the vertical direction in FIG. 17). This feature is the same as in the embodiments described above.

The feature that differs from the embodiments described above is that the number of fuel ejection orifices 13, 14 provided to the fuel ejectors F1, F2 is one in the example shown in FIG. 21.

Although not shown in the drawings, auxiliary ejection orifices 23, 23 described in the embodiment above may be disposed in the fuel ejectors F1, F2 so as to be positioned in a medial position in the crosswise direction (the specific direction as viewed in the lengthwise direction of fuel ejection) between the first fuel ejection orifice 13 (left fuel ejection orifice) and the second fuel ejection orifice 14 (right fuel ejection orifice), in relation to the fuel ejection orifices 13, 14 constituting a pair in the crosswise direction (the specific direction as viewed in the lengthwise direction of fuel ejection), and that are positioned to both sides in the vertical direction (the orthogonal direction orthogonal to the specific direction as viewed in the lengthwise direction of fuel ejection), in relation to the fuel ejection orifices 13, 14 constituting a pair in the crosswise direction (the specific direction as viewed in the lengthwise direction of fuel ejection).

The auxiliary ejection orifices 23, 23 eject gas fuel, are set so that the direction in which gas fuel is ejected is the crosswise intermediate direction (front/back direction of the plane of the drawing in FIG. 21, and the direction that does not slope leftward or rightward), and are provided in a vertical position and parallel to the vertical direction (the crosswise direction of FIG. 21) of the collision position of the ejection streams ejected from the fuel ejection orifice 13 (left fuel ejection orifice) and the fuel ejection orifice 14 (right fuel ejection orifice) so as to have a smaller diameter flame port than the fuel ejection orifices 13, 14. As a result, the distal end of the fuel feeder W can be cooled.

Other Embodiments

Other embodiments are described next.

Figure 22:
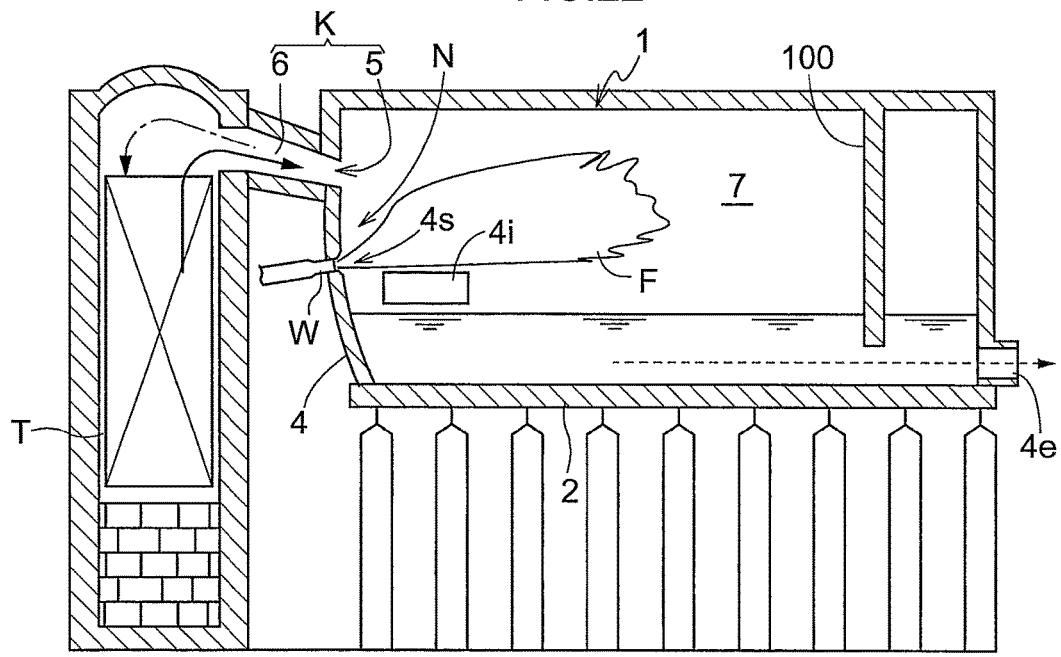
FIG. 22 is a view in which the combustion device according to the present invention has been applied to an end port-type melting furnace.
Figure 23:
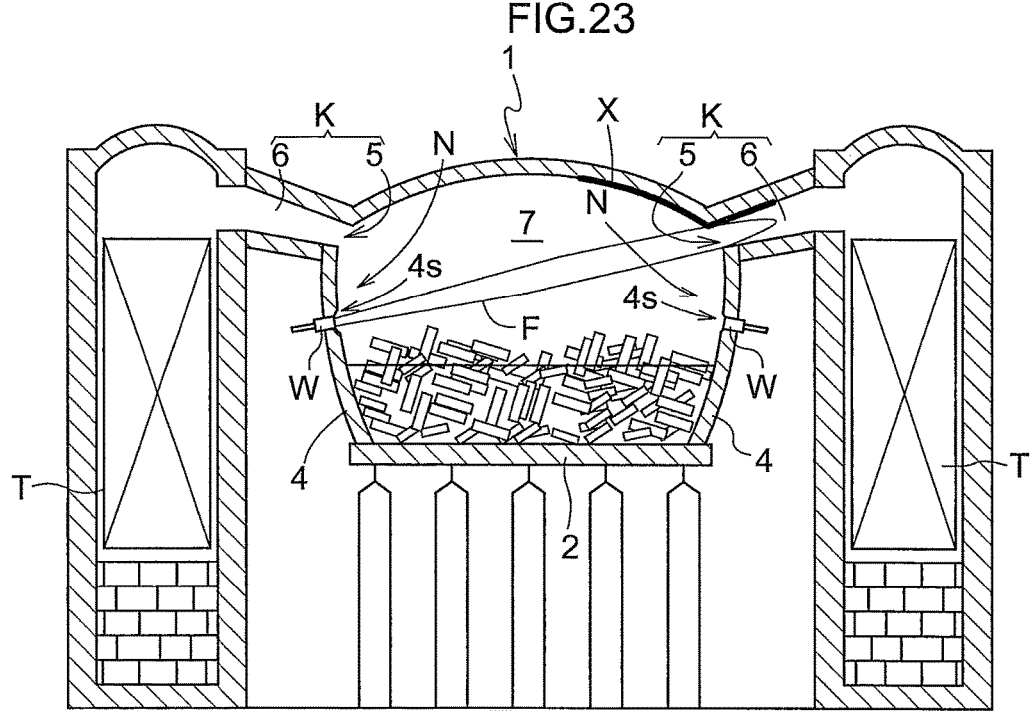
FIG. 23 is a descriptive view showing the problems of prior art in a cross fired-type glass melting furnace.

(1) In the combustion device for melting furnace of the present invention, the side parts of the melting zone are advantageously lined up along the direction in which an charging port for inputting raw material and an extraction port for extracting melted objects are lined up, as shown in the embodiments described above, but the side parts are not required to be provided in such a mode, and various modes can be applied in a melting furnace. The embodiment shown in FIG. 22 is of an "end-port" type, and combustion devices constituting pairs are provided to the raw material charging port 4i side of the melting zone 2, which is on the left side in the drawing, in the front/back direction of FIG. 22, one of the combustion devices N (the combustion device located on the side of FIG. 22 closer to the viewer) can be used as the gas fuel combustion side, and the other combustion device N (the combustion device located on the side of FIG. 22 further away from the viewer) can be used as side for receiving the combustion exhaust gas generated by combustion. In FIG. 22, the solid line indicates the direction of flow of combustion oxygen-containing gas required flame combustion, and the alternate long and short dash line indicates the direction of flow of combustion exhaust gas. The dotted line indicates the direction of flow of the glass material.

(2) The combustion device for a melting furnace of the present invention can be applied to the glass-melting furnace shown in the embodiments described above, and may also be used as a combustion device in various melting furnaces, including a melting furnace for melting metal other than glass material, (3) In the embodiments described above, examples of the case in which three combustion devices for a melting furnace are provided to the side parts of the melting zone and along the direction in which the charging port for inputting raw material and the extraction port for extracting the melted object are lined up (the direction of flow of the glass material). However, two combustion devices for a melting furnace may be provided along the direction in which the charging port for inputting raw material and the extraction port for extracting the melted object are lined up (the direction of flow of the glass material). Also, four or more combustion devices for a melting furnace may be provided along the direction in which the charging port for inputting raw material and the extraction port for extracting the melted object are lined up (the direction of flow of the glass material).

In the case that two combustion devices for a melting furnace are provided along the direction in which the charging port for inputting raw material and the extraction port for extracting the melted object are lined up (the direction of flow of the glass material), the combustion device near the charging port forms an upwardly aimed combustion flame and the combustion device near the extraction port forms a combustion flame that extends considerably along the upper surface of the object to be melted.

In the case that four or more combustion devices for a melting furnace are provided along the direction in which the charging port for inputting raw material and the extraction port for extracting the melted object are lined up (the direction of flow of the glass material), the combustion device near the charging port forms a combustion flame that extends obliquely upward, the combustion device near the extraction port forms a combustion flame that extends a considerable length in progress toward the horizontal direction (e.g., the crosswise direction of FIG. 1), and the combustion devices intermediately positioned between the charging port and the extraction port include ones that form a combustion flame that does not aim more considerably upward than the combustion flame formed by the combustion device near the charging port, ones that form a combustion flame that aims upward and is not longer than the combustion flame formed by the combustion device near the extraction port, and ones that form a combustion flame that is greater in length in progress in the horizontal direction (e.g., the crosswise direction of FIG. 1).

(4) In the embodiments described above, examples were described in which two or four fuel ejectors are provided in a line in the vertical direction or in the crosswise direction as the specific direction as viewed in the lengthwise direction of fuel ejection, but it is also possible to provide five or more fuel ejectors.

It is also possible to use a configuration in which the specific direction is set in the two directions of the vertical direction and the crosswise direction, and in which the upper fuel ejector, the lower fuel ejector, the left fuel ejector, and the right fuel ejector are used as four fuel ejectors. In this case, the ejection streams ejected from upper fuel ejector and the lower fuel ejector constituting a pair are configured to collide on the downstream side of the ejections, and the ejection streams ejected from left fuel ejector and the right fuel ejector constituting a pair are configured to collide on the downstream side of the ejections.

The specific direction is furthermore not limited to the vertical direction of the crosswise direction; it is also possible to set the specific direction in any diameter direction that passes through the center axis of the cylindrical fuel ejection nozzle 12 as viewed in the lengthwise direction of fuel ejection. In other words, the fuel ejectors F1, F2 shown in FIG. 5 can be disposed so that the fuel ejectors F1, F2 are in positions rotated by any rotation angle to the right or the left about the center axis of the fuel ejection nozzle 12 as viewed in the lengthwise direction of fuel ejection, and so that the ejection streams ejected from the fuel ejectors F1, F2 collide on the downstream side of ejection.

The number of fuel ejection orifices provided in a line in the horizontal direction (e.g., the crosswise direction of FIG. 5) may be varied for each fuel ejector, and the number of fuel ejection orifices provided to each fuel ejector is not required to be the same and may be modified.

(5) In the embodiments described above, configurations were described in an alternating combustion-type combustion device in which ejection streams ejected from gas fuel ejectors constituting a pair were made to collide on the distal end side, but the length of the flames and the amount of spread of the flames in the vertical direction or in the crosswise direction as the specific direction can be adjusted using the same structure in a "regenerative burner" or a "recuperative burner."

INDUSTRIAL APPLICABILITY

The present invention can be used as combustion device and a melting furnace provided with the combustion device which does not cause an increase in the amount of generated NOx or a degradation in efficiency due to a lower flame luminance, even when the combustion space is limited in the lengthwise direction of the flame.

KEY 2 melting zone
4*i* Charging port
4*e* Extraction port
4*d* Furnace wall through-hole
12 Fuel ejection nozzle
13 Fuel ejection orifice
14 Fuel ejection orifice
15 Fuel ejection orifice
16 Fuel ejection orifice
23 Auxiliary ejection orifices
A Combustion air
F1 Fuel ejector
F2 Fuel ejector
F3 Fuel ejector
F4 Fuel ejector
H Flow rate modification and adjustment means
K Combustion air feeder
N Combustion device for a melting furnace
W Fuel feeder

The invention claimed is:

1. A combustion device for a glass melting furnace in which a fuel ejector for ejecting gas fuel into a combustion space above an area of a melting zone in which an object to be melted as a glass material is present is disposed, the fuel ejector having a fuel ejection nozzle disposed in a wall of the furnace to eject the gas fuel from a lateral location in the combustion space, and in which a combustion air feeder for feeding combustion air obliquely downward to the combustion space has an air port that is disposed in a wall of the furnace in a location separate from and above the fuel ejection nozzle, wherein the fuel ejector comprises a first fuel ejector and a second fuel ejector lined up in one specific direction, as viewed in the lengthwise direction of fuel ejection;

a plurality of fuel ejection orifices are lined up in an orthogonal direction orthogonal to the specific direction as viewed in the lengthwise direction of fuel ejection, in each of the first fuel ejector and the second fuel ejector, and in relation to the first fuel ejection orifices positioned on one side and second fuel ejection orifices positioned on the other side thus forming a pair in the specific direction, a first ejection stream ejected from the first fuel ejection orifices and a second ejection stream ejected from the second fuel ejection orifices are configured so as to collide on the downstream side of ejection between the fuel ejection orifices constituting a pair;

the plurality of first fuel ejection orifices provided to the first fuel ejector and the plurality of second fuel ejection orifices provided to the second fuel ejector are configured to widen in a radial fashion on the downstream side of ejection or to converge inside a predetermined range as viewed in the specific direction;

the amount of gas fuel of the first ejection stream ejected from the first fuel ejection orifice positioned to one side in the specific direction and the amount of gas fuel of the second ejection stream ejected from the second fuel ejection orifice positioned to the other side are configured so as to be capable of being mutually or independently adjusted; and all of the combustion air introduced to the combustion space is fed from the combustion air feeder.

2. The combustion device for a glass melting furnace according to claim 1, wherein each of the first fuel ejector and the second fuel ejector comprises a single fuel ejection orifice; and the first ejection stream ejected from the first fuel ejection orifice positioned to one side in the specific direction and the second ejection stream ejected from the second fuel ejection orifice positioned to the other side in the specific direction are configured so as to collide on the downstream side of ejection.

3. The combustion device for a glass melting furnace according to claim 2, wherein auxiliary ejection orifices are provided in a medial position in the specific direction between the first fuel ejection orifice and the second fuel ejection orifice in relation to the fuel ejection orifices constituting a pair in the specific direction, and in positions on both sides in the orthogonal direction orthogonal to the specific direction as viewed in the lengthwise direction of the fuel ejection in relation to the fuel ejection orifices constituting a pair in the specific direction.

4. A glass melting furnace, in which
a fuel ejector for ejecting gas fuel into a combustion space above an area of a melting zone in which an object to be melted is present is disposed so as, the fuel ejector having a fuel ejection nozzle disposed in a wall of the furnace to eject gas fuel from a lateral location in the combustion space;
a combustion air feeder for feeding combustion air obliquely downward to the combustion space, the combustion air feeder having an air port that is disposed in the wall of the furnace in a location separate from and above the fuel ejector ejection nozzle; and
the gas fuel is caused to combust; wherein
the combustion device for a glass melting furnace according to claim 1 is provided in a furnace wall.

5. The glass melting furnace according to claim 4, wherein
there is provided at least a pair of combustion devices having the fuel ejector and the combustion air feeder for feeding combustion air to gas fuel ejected from the fuel ejector; and
in a state where gas fuel is fed from the fuel ejector of the combustion device on a first side and combustion air is fed from a combustion air feeder, the combustion air feeder of the combustion device on a second side serves as an exhaust gas introduction unit for receiving from the combustion space the exhaust gas generated by combustion carried out by the combustion device on the first side, and alternating combustion for repeatedly combusting gas fuel and receiving exhaust gas in alternating fashion is carried out between the combustion devices constituting a pair.

6. The glass melting furnace according to claim 5, wherein
a pair of the combustion devices is provided on both sides with the movement direction of the object to be melted therebetween; and the combustion air feeder of the combustion device on the second side is opened in a distal end in the axial direction of a flame formed by the combustion of gas fuel ejected from the fuel ejector of the combustion device on the first side.

7. The glass melting furnace according to claim 4, wherein
in a furnace wall through-hole in which the fuel ejector is to be provided, the cross-sectional area of the furnace wall through-hole is gradually increased in progression from the distal end of the fuel ejector toward the inside end face of the melting furnace; and
the position of collision between a first ejection stream ejected from said at least one first fuel ejection orifice and a second ejection stream ejected from the respective second fuel ejection orifice is set further to the inner side of the furnace wall than the inside end face of the melting furnace.

8. The glass melting furnace according to claim 5, wherein
in a furnace wall through-hole in which the fuel ejector is to be provided, the cross-sectional area of the furnace wall through-hole is gradually increased in progression from the distal end of the fuel ejector toward the inside end face of the melting furnace; and
the position of collision between a first ejection stream ejected from said at least one first fuel ejection orifice and a second ejection stream ejected from the respective second fuel ejection orifice is set further to the inner side of the furnace wall than the inside end face of the melting furnace.

9. The glass melting furnace according to claim 6, wherein
in a furnace wall through-hole in which the fuel ejector is to be provided, the cross-sectional area of the furnace wall through-hole is gradually increased in progression from the distal end of the fuel ejector toward the inside end face of the melting furnace; and
the position of collision between a first ejection stream ejected from said at least one first fuel ejection orifice and a second ejection stream ejected from the respective second fuel ejection orifice is set further to the inner side of the furnace wall than the inside end face of the melting furnace.

10. The combustion device for a glass melting furnace according to claim 1, wherein the amount of gas fuel of the first ejection stream ejected from the first fuel ejection orifice positioned to one side in the specific direction and the amount of gas fuel of the second ejection stream ejected from the second fuel ejection orifice positioned to the other side are adjusted while the first ejection stream and the second ejection stream collide.

11. The combustion device for a glass melting furnace according to claim 1, wherein the amount of gas fuel of the first ejection stream ejected from the first fuel ejection orifice and the amount of gas fuel of the second ejection stream ejected from the second fuel ejection orifice are adjusted so that each of the first ejection stream and the second ejection stream has a flow rate greater than zero.

* * * * *